(12) United States Patent
Bataille et al.

(10) Patent No.: US 10,023,381 B2
(45) Date of Patent: Jul. 17, 2018

(54) TEXTILE SILICA REDUCTION SYSTEM

(71) Applicant: Black Bow SDR, LLC, Tulsa, OK (US)

(72) Inventors: Matthew A. Bataille, Jackson, MS (US); Bryan E. Berman, Sand Springs, OK (US); Collin D. Sharp, Tulsa, OK (US)

(73) Assignee: Black Bow SDR, LLC, Tulsa, OK (US)

( * ) Notice: Subject to any disclaimer, the term of this patent is extended or adjusted under 35 U.S.C. 154(b) by 18 days.

(21) Appl. No.: 14/937,670

(22) Filed: Nov. 10, 2015

(65) Prior Publication Data

US 2016/0059168 A1 Mar. 3, 2016

Related U.S. Application Data

(63) Continuation-in-part of application No. 14/152,914, filed on Jan. 10, 2014, now Pat. No. 9,440,174.

(60) Provisional application No. 62/077,751, filed on Nov. 10, 2014, provisional application No. 61/751,221, filed on Jan. 10, 2013.

(51) Int. Cl.
*B01D 46/10* (2006.01)
*B01D 46/00* (2006.01)
*B01D 46/02* (2006.01)
*B65D 88/30* (2006.01)
*B65G 69/18* (2006.01)

(52) U.S. Cl.
CPC ........... *B65D 88/30* (2013.01); *B65G 69/182* (2013.01); *B01D 46/0004* (2013.01); *B01D 46/0005* (2013.01); *B01D 46/02* (2013.01); *B01D 46/10* (2013.01)

(58) Field of Classification Search
CPC ...................... B01D 46/0004; B01D 46/0005; B01D 46/10; B01D 46/00; B01D 39/083; B01D 46/02; B01D 2239/1291
USPC ........ 55/385.1, 319, 515.1, 356, 481.1, 419, 55/467.1, DIG. 10; 96/135, 136, 138, 96/140, 142; 126/343.5
See application file for complete search history.

(56) References Cited

U.S. PATENT DOCUMENTS

| | | |
|---|---|---|
| 4,547,420 A | 10/1985 | Krueger et al. |
| 4,820,315 A | 4/1989 | DeMarco |
| 5,053,063 A | 10/1991 | Sisk |
| 5,156,662 A | 10/1992 | Downing et al. |
| 5,199,354 A | 4/1993 | Wood |
| 6,221,120 B1 | 4/2001 | Bennington et al. |
| 6,290,741 B1 | 9/2001 | Lopp |

(Continued)

*Primary Examiner* — Robert A Hopkins
*Assistant Examiner* — Minh-Chau Pham
(74) *Attorney, Agent, or Firm* — Hall Estill Attorneys at Law

(57) ABSTRACT

Apparatus for reducing airborne proppant adjacent a fracking material handling system. In some embodiments, a proppant reduction cover is mounted over a first aperture of a proppant storage chamber and has a permeable filter material adapted to facilitate a first flow of displaced air therethrough as proppant is loaded into the chamber. A vent sock is mounted over a second aperture of the chamber and has a permeable filter material facilitate a second flow of displaced air therethrough during the loading of the proppant. A vacuum adapter is mounted over a third aperture of the chamber to apply a negative pressure to an interior of the proppant storage chamber during said loading of the proppant.

20 Claims, 17 Drawing Sheets

(56) References Cited

U.S. PATENT DOCUMENTS

| | | |
|---|---|---|
| 6,786,946 B2 | 9/2004 | Jung |
| 7,332,011 B1 | 2/2008 | Sandberg |
| 7,491,687 B2 | 2/2009 | Popplewell et al. |
| 8,460,443 B2 | 6/2013 | Seitz |
| 8,870,990 B2 | 10/2014 | Marks et al. |
| 9,169,706 B2 * | 10/2015 | Kellam, III .............. E21B 27/00 |
| 9,174,812 B2 | 11/2015 | Harris |
| 9,440,174 B2 * | 9/2016 | Barrett ............... B01D 46/0004 |
| 2006/0168925 A1 | 8/2006 | Whittemore |
| 2012/0247335 A1 | 10/2012 | Stutzman et al. |
| 2012/0304860 A1 | 12/2012 | Matson |
| 2013/0309052 A1 * | 11/2013 | Luharuka ................. B65G 3/04 |
| | | 414/291 |
| 2014/0020346 A1 * | 1/2014 | Esswein ................. B01D 46/02 |
| | | 55/304 |
| 2014/0102301 A1 | 4/2014 | Marks et al. |
| 2016/0009489 A1 * | 1/2016 | Lofton ................... B65D 88/56 |
| | | 414/414 |
| 2017/0104389 A1 * | 4/2017 | Morris ................ H02K 7/1823 |

* cited by examiner

BLOW IN PROCESS

TEXTILE SILICA REDUCTION SYSTEM

RELATED APPLICATIONS

The present application claims priority to U.S. Provisional Application No. 62/077,735 filed Nov. 10, 2014, and is a continuation-in-part of U.S. application Ser. No. 14/152,914 filed Jan. 10, 2014, now issued as U.S. Pat. No. 9,440,174 and which claims priority to U.S. Provisional Application No. 61/751,221 filed Jan. 10, 2013. The contents of these priority documents are incorporated by reference.

BACKGROUND

Hydraulic fracturing, also commonly referred to as "hydrofracking," is a technique used in the removal of oil and natural gas from reservoirs contained in subsurface rock formations. Hydraulic fracturing works by increasing the pressure in the formation rock so that fractures form, creating a pathway through which oil and gas can travel to the well bore. Hydraulic fractures are typically created by pumping a fracturing fluid into a wellbore at a rate sufficient to increase the pressure downhole to an amount that exceeds the fracture strength of the formation rock. The increased pressure due to the high-pressure pumping of the fracturing fluid causes cracks to form in the formation rock. The fracturing fluid can then enter the cracks and extend the cracks further into the formation. Solid proppant is typically added to the fracture fluid to keep the cracks open.

The solid proppant is often a silica containing material, such as silica sand or resin coated silica sand. Large amounts of dust are created and released into the atmosphere when proppant is prepared for use in the hydrofracking process. During preparation, large amounts of proppant are trucked into the drill site by pneumatic tankers. The proppant is then blown from the pneumatic tanker into proppant storage trailers (more generally, storage vessels) sometimes referred to as "sand chiefs," "sand hogs," "sand kings," "mountain movers," or "frac sanders." The top of the proppant storage trailers incorporate a series of vent hatches that vent pressurized air as the proppant is pumped into the storage trailer. As the air is vented through the top of the storage trailer, large amounts of silica-containing dust blow out the vent hatches. The flow of dust through the vent hatches creates large dust clouds when storage trailers are filled with proppant. The dust clouds obscure vision and may create an inhalation hazard for workers at the well site.

After proppant is loaded into the storage trailer, it is then used in the fracking process. In a typical arrangement, proppant flows out of valves on the bottom of the trailer onto a conveyor belt that is underneath the trailer. The proppant next flows onto a "stinger" or "t-belt," which are moveable conveyor belts that lift the proppant onto a sand blender or "pod" machine. The sand blender receives the dry proppant into a hopper at the rear of the machine (the "pod hopper") and then blends it into a slurry having constituent components such as water, sand, dry chemicals and liquid chemicals to provide the desired fracturing fluid. The slurry is pumped to the fracking well site. The flow of proppant into the sand blender pod hopper from the storage trailer creates large amounts of silica dust.

Presently, one method for reducing the flow of dust through the storage trailer vent hatches is use of a loose-fitting fabric filter bag that is attached to the access door. The fabric filter bag is shaped like a garbage bag that inflates with air and stands upright when proppant is loaded onto the storage trailer. The fabric filter bags are undesirable because the loose fit often causes the filter bag to be completely or partially blown off the vent hatch, allowing large amounts of dust to escape. The bags are also easily blown off the vent hatch because the bag stands upright when inflated.

The use of the loose-fitting fabric filter bags is disfavored because the bags make it impossible for workers to look down into the vent hatch to monitor the amount of proppant being pumped into the storage trailer. Because of the drawbacks of the loose-fitting fabric filter bags, employees of many hydrofracking operations choose to use no filter device on proppant storage trailer vent hatches, allowing large amounts of dust to be emitted.

Additionally, there is no easily feasible method for limiting the large amounts of dust that are generated when proppant drops onto the conveyor belt and is transferred from the storage trailer onto the sand blender. One current method for reducing the dust involves the placement of metal manifolds near the conveyor belt and other pieces of fracking equipment. The metal manifolds are vacuum via a system of ducts, and negative pressure generated by the vacuum removes some of the dust generated during the proppant transfer. This method is undesirable because it requires a large amount of vacuum to generate enough negative pressure to "suck up" the dust, and it requires constant monitoring of the system to remove the dust. Additionally, it collects large amounts of proppant which can then be re-incorporated into the fracking process.

Accordingly, there remains a need for a filtering system that may be easily used to minimize or prevent the emission of silica dust particles during the preparation of proppant for hydraulic fracturing.

SUMMARY

Various embodiments of the present disclosure are generally directed to an apparatus for reducing airborne proppant adjacent a fracking material handling system.

Without limitation, in some embodiments a proppant reduction cover is mounted over a first aperture of a proppant storage chamber and has a permeable filter material adapted to facilitate a first flow of displaced air therethrough as proppant is loaded into the chamber. A vent sock is mounted over a second aperture of the chamber and has a permeable filter material facilitate a second flow of displaced air therethrough during the loading of the proppant. A vacuum adapter is mounted over a third aperture of the chamber to apply a negative pressure to an interior of the proppant storage chamber during said loading of the proppant.

These and other features and advantages of various embodiments can be understood upon review of the following detailed description and the associated drawings.

DETAILED DESCRIPTION

Figure 1:
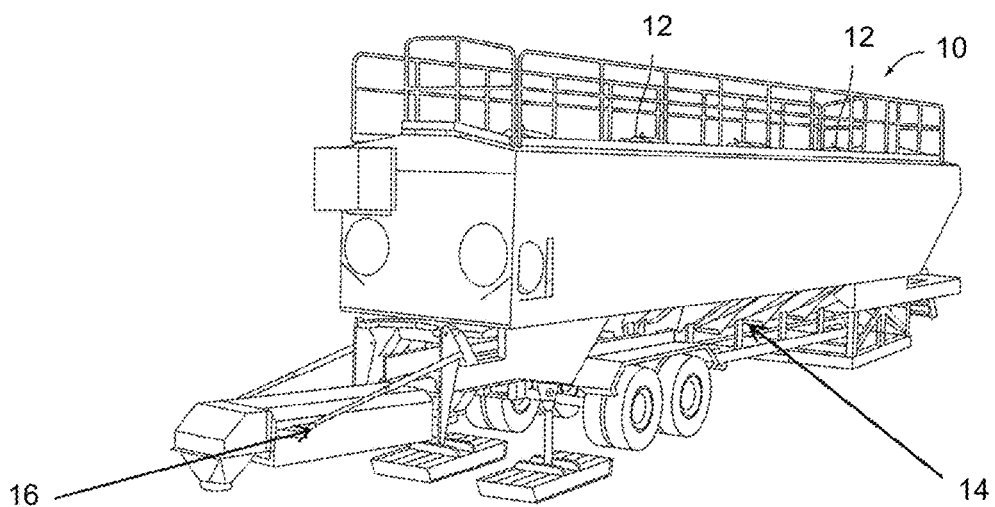
FIG. 1 is a perspective view of a proppant storage trailer in accordance with some embodiments, also herein variously referred to as a proppant storage vessel, proppant storage chamber, frac sander, etc.

Various embodiments of the present disclosure overcome limitations associated with the prior art by providing a filtering and containment system that may be easily and securely installed to prevent large amounts of dust from escaping out of proppant storage trailer access doors and from the trailer's conveyor and stinger. As variously configured, the system is operable to prevent or reduce the generation of airborne contaminants during the loading of proppant ("blown in processing") and/or during the transport of the proppant ("blending processing").

As explained below, the textile silica reduction system as embodied herein can include a proppant reduction cover, vent socks, vacuum adapters, trailer skirts, stinger covers, rain covers, a pod cover, upper pod panels and lower pod panels.

The proppant reduction cover is a custom fit filter installed on the lip of each proppant storage trailer vent hatch. The top of each trailer has a series of vent hatches that release air and fine particles into the atmosphere during material transfer operations. The unique proppant reduction cover design, utilizing a premium filter material, permits the controlled release of high pressure air at each vent hatch while reducing sand particle loss. The proppant reduction cover maintains sand product in the trailer for production reuse while significantly reducing airborne sand particles in the immediate work and adjoining site areas. The proppant reduction cover incorporates a viewing window so that workers may monitor proppant levels in the storage trailer while the proppant reduction cover is installed. Weather covers may be placed over the proppant reduction covers during inclement weather. The weather cover is made of an impermeable, waterproof material that prevents the proppant reduction cover from becoming saturated with rain water. The weather cover loosely fits over the proppant reduction cover and allows air to escape from the proppant reduction cover during the material transfer operations.

A textile or metal vacuum adapter may be placed onto one or more of the proppant storage trailer vent hatches. The lower portion of the vacuum adapter fits over and is secured to the lip of the vent hatch. The vacuum adapter may be constructed of an impermeable, waterproof material, a filter fabric, or other suitable material. The upper portion of the vacuum adapter is attached to a vacuum hose. Negative pressure may be applied to the vacuum hose to allow workers to more easily view the contents of the storage trailer.

The vent socks are cylindrical filters adapted to fit circular valves and vents that are common on proppant storage trailers. The vent sock may be held in place using a ratchet strap and allows the release of high pressure air while loading the trailer. A zipper in the bottom of the vent sock allows workers to remove proppant that builds up in the vent sock.

Before or after the trailer is loaded, workers may install trailer skirts around the perimeter of the trailer. Trailer skirts are made of a waterproof material that stops the emission of dust created when proppant is transferred on the conveyor. The skirts attach to the trailer using high-strength magnets, and the bottoms of the skirts may be staked or weighted to the ground (the skirts have loops at the bottom and steel pole is slid in the loops to weigh them down). The trailer skirts include clear viewing windows to allow workers to view proppant on the conveyor.

A stinger cover wraps over the top and side of the stinger and prevents the emission of dust created when the stinger transfers proppant to a sand blender. The stinger cover is comprised of a waterproof material that prevents dust from escaping and also keeps the proppant dry, permitting use of the stinger in adverse weather conditions. The stinger cover is held in place using high-strength magnets sewn into the cover. Visibility windows are incorporated into the stinger cover so operators can view the speed of the conveyor belt and the amount of proppant being transferred into the blender. In some embodiments, the stinger is replaced by a T-belt conveyor that transfers proppant. In these embodiments, a T-belt cover is used to minimize the emission of dust from the T-belt conveyor. The T-belt cover is comprised of waterproof material that prevents the dust from escaping and keeps the proppant dry. Visibility windows are incorporated into the T-belt cover so operators can view the speed of the conveyor belt and the amount of proppant that is being transferred into the blender.

When proppant leaves the stinger or T-belt, it is deposited into a sand blender. A pod cover, upper pod panels and lower pod panels are used to prevent large amounts of dust from escaping during the transfer of proppant into the sand blender. Each of the components is made of impermeable, waterproof materials that prevent dust from escaping. High-strength magnets are used to attach the pod cover, upper pod panels and lower pod panels to the sand blender, and hook and loop fasteners are incorporated around the perimeter of each component so the components may be attached to one another.

A sand catcher may be disposed at a distal end of the stinger to collect proppant that does not get transferred to the upper pod. The sand catcher can include a specially shaped receptor bowl having a rectangular, trapezoidal, circular or other suitable shape. The sand catcher can include at least one vacuum or gravity fed ports to receive heavier proppant particulates that collect in the bowl. One or more vacuum ports can be connected to a vacuum line to further capture airborne proppant at the juncture of the distal end of the stinger and the upper pod. A sand catcher cover can be placed over the sand catcher to further entrap airborne contaminants and to direct the flow of the proppant into the upper pod.

The pod cover is attached to the top of the pod hopper or the pod hopper hood. Upper pod panels attach to the pod cover and cover the open space between the top and bottom of the pod hopper. Lower pod panels cover the lower hopper and prevent dust from escaping out of this area. Clear viewing windows are incorporated into the upper and lower pod panels to allow workers to observe the proppant while the sand blender is in use. A closeable vent hatch is incorporated on the top of pod hopper. A textile vacuum adapter may be placed onto the pod hopper hatch. The lower portion of the vacuum adapter fits over and is secured to the lip of the vent hatch. The upper portion of the vacuum adapter is attached to a vacuum hose. Negative pressure may be applied to the vacuum hose to allow workers to more easily view the contents of the pod hopper.

Figure 2:
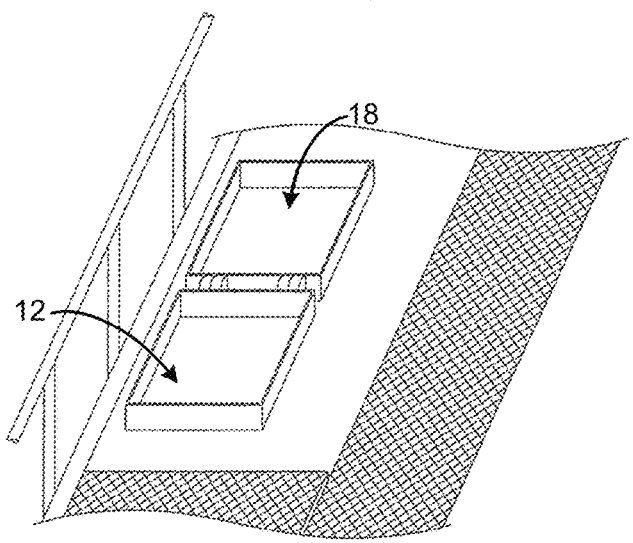
FIG. 2 is an objective view of a vent hatch located on top of a proppant storage trailer.

These and other features and advantages of various embodiments can be understood beginning with a review of FIG. 1, which provides a perspective view of a proppant storage trailer or "frac sander" 10. Proppant is loaded into interior proppant storage chambers (not shown) of the frac sander 10 through hoses connected to a pneumatic tanker (not shown). The proppant is pushed into the frac sander 10 using compressed air. A series of vent hatches 12, as shown in FIG. 2, are connected to each of the proppant storage chambers at the top of the frac sander 10 so that the pressurized air can escape as proppant is loaded in the proppant storage chambers.

A conveyor belt 14 beneath the proppant storage chambers runs the length of the frac sander 10. Valves (not shown) on the underside of the proppant storage chambers are selectively opened to deposit proppant onto the conveyor belt 14. Proppant is transferred from the conveyor belt 14 onto a stinger 16 (a moveable, articulated conveyor) to transfer the proppant into a sand blender (not shown). As stated, FIG. 2 depicts one of the vent hatches 12 (each having a vent hatch door 18) that are located on top of the frac sander 10. The vent hatch 12 and vent hatch door 18, as depicted in FIG. 2, are rectangular in shape, but other shapes of such may be used.

Large amounts of dust can escape from the proppant storage chambers through the vent hatches 12 if open during the proppant loading. When the vent hatches 12 are closed, the time required to load the frac sander 10 is substantially increased because the excess pressurized air cannot quickly escape from the frac sander 10. Even when the vent hatch doors 18 are closed, the pressurized air often forces the vent hatch doors 18 open, which allows air and proppant dust to be exhausted into the atmosphere.

Figure 3:
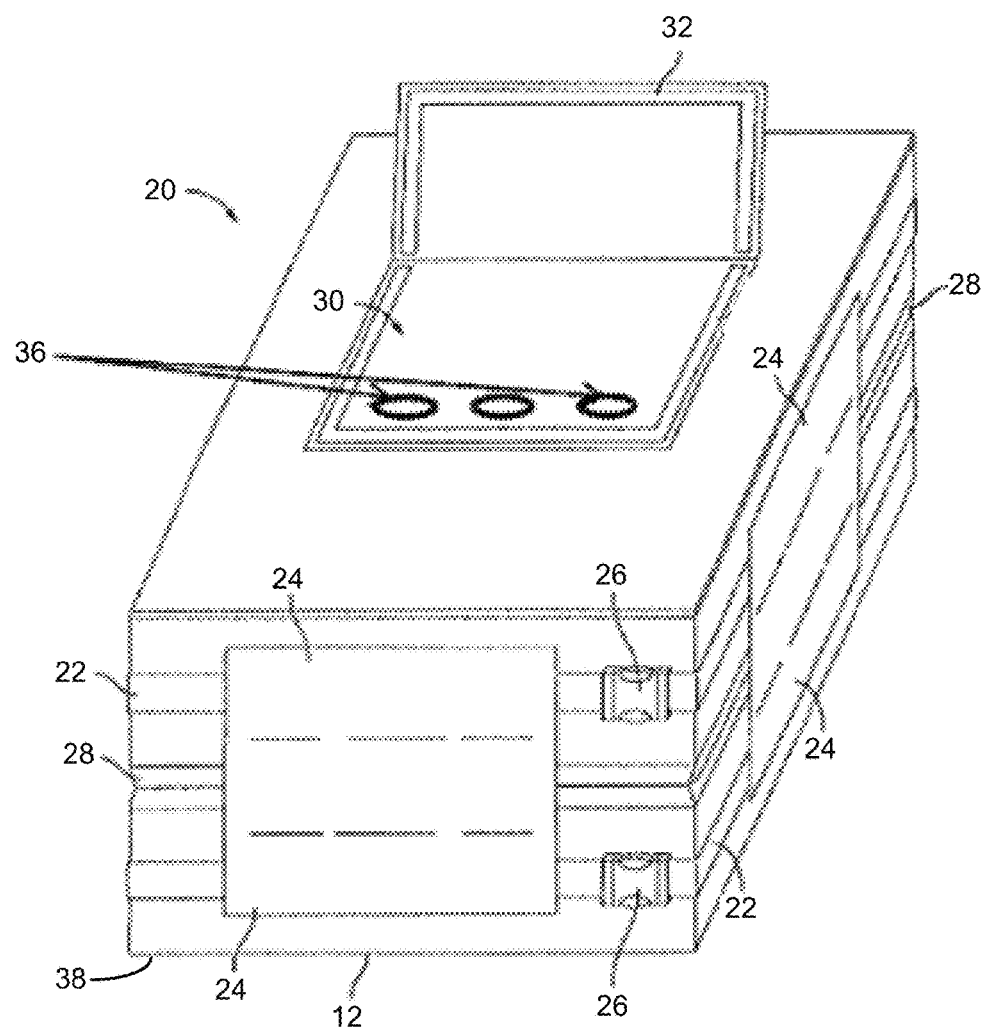
FIG. 3 is a perspective view of a proppant reduction cover.

A proppant reduction cover 20, depicted in FIG. 3, is a custom fit filter that can be installed on each vent hatch 12 to prevent dust from escaping to the atmosphere during proppant loading to the proppant storage chambers. The proppant reduction cover 20 is made of a permeable filter material adapted to release the pressurized air created when proppant is loaded into the proppant storage chambers of the frac sander 10 while preventing dust from escaping. The proppant reduction cover 20 of FIG. 3 is rectangular in shape and is sized to fit around the lip of a rectangular vent hatch 12. In other embodiments, other shapes may be incorporated so that the proppant reduction covers 20 conform to the vent hatches 12.

Figure 4:
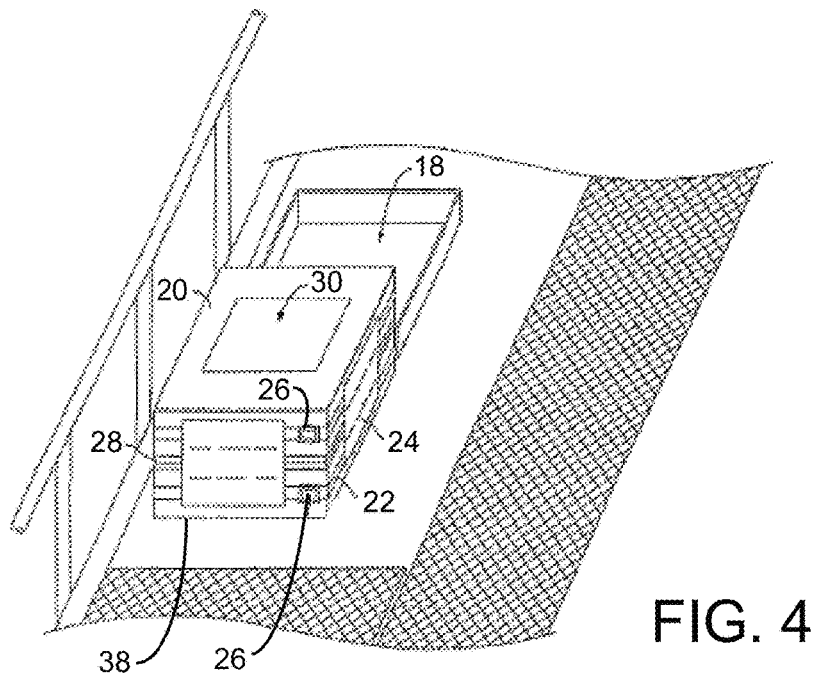
FIG. 4 is a perspective view of the proppant reduction cover installed on a proppant storage trailer vent hatch.

One or more straps 22 are inserted into strap loops 24 sewn around the perimeter of the proppant reduction cover 20. In FIG. 4 the strap loops 24 are sewn at intermittent intervals around the proppant reduction cover 20, but the strap loops 24 may be sewn around the entire proppant reduction cover 20 to form a sleeve. The ends of the straps 22 are fastened together using quick release buckles 26, but other fastener mechanisms can be used, including but not limited to ratcheting tighteners, buckle tie-downs, quick-connect straps or bungee straps. The buckles 26 are adapted to allow a user to tighten or loosen the length of the straps 22 that pass through the buckles 26. The proppant reduction cover 20 is composed of separate pieces of filter material that can be sewn together with one or more pleats 28 that allow the height of the proppant reduction cover 20 to increase when inflated by pressurized air.

One or more clear pieces of material may be sewn into the proppant reduction cover 20 to create one or more viewing windows 30. The viewing windows 30 allow a user to look down into the frac sander 10 to determine how much proppant has been loaded into the frac sander 10. The viewing windows 30 can be incorporated into the top or sides of the proppant reduction cover 20. A viewing window cover 32 for one or more of the viewing windows 30 may be incorporated into the proppant reduction cover 20. The viewing window covers 30 can be closed to prevent damage to the clear material of the viewing windows 30. When closed, the viewing window covers 32 may be secured by strips of hook and loop fastener 34 around the perimeter of each of the viewing windows 30 and the viewing window covers 32. One or more vents 36 may be incorporated into the proppant reduction cover 20 to allow excess pressure to be relieved. The vents 36 may be sealed using the viewing window cover 32, or an additional cover can be incorporated into the proppant reduction cover 32.

A series of magnets (not shown) may be incorporated into the material at the lower edge 38 of the proppant reduction cover 20 to help seal the cover to the metallic lip around the vent hatch 12. Additionally, flexible gasket material may be attached to the inner lip of the lower edge 38 of the proppant reduction cover 4 to create a stronger seal around the vent hatch 12. In one embodiment the flexible gasket material may be synthetic wool, but other appropriate materials can be used.

FIG. 4 depicts the proppant reduction cover 20 installed onto one of the vent hatches 12. To install the proppant reduction cover 20 to the vent hatch 12, a worker unbuckles the straps 22 via the buckles 26 and places the proppant reduction cover 20 over the vent hatch 12. Next, the worker buckles and tightens the straps 22 to hold the proppant reduction cover 20 in place. As pressurized air exits the vent hatch 12 the proppant reduction cover 20 will inflate and stand upright. One may look through the viewing window 30 to determine when the frac sander 10 is full and the loading process is complete.

Figure 5:
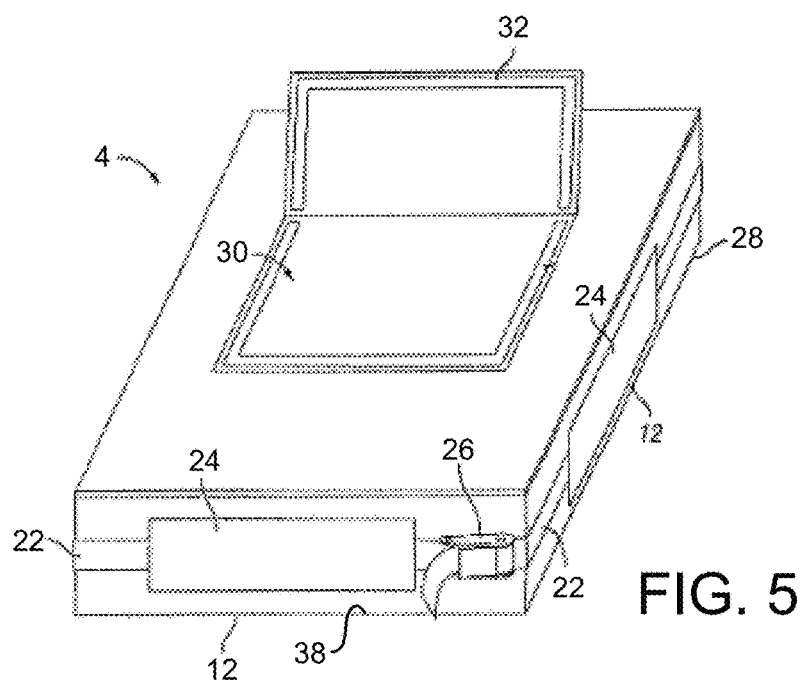
FIG. 5 is a perspective view of another embodiment of a proppant reduction cover.

FIG. 5 depicts another embodiment of the proppant reduction cover 20. The proppant reduction cover 20 of FIG. 5 is rectangular in shape and is sized to fit around the lip of a rectangular vent hatch 12. The embodiment depicted in FIG. 5 has one strap 22 inserted into strap loops 24 sewn around the perimeter of the proppant reduction cover 4. The ends of the strap 22 are fastened together with a ratcheting quick release buckle 26. The buckle 26 serves to tighten the strap 22 around the lip of a vent hatch 12 to hold the proppant reduction cover 20 securely in place.

Figure 6:
FIG. 6 is a photograph of a weather cover.

FIG. 6 is a photograph of a weather cover 40 that may be placed over the proppant reduction covers 20 during inclement weather. The weather cover 40 can be made of an impermeable, waterproof material that prevents the proppant reduction cover 20 from becoming saturated with rain water. The weather cover 40 loosely fits over the proppant reduction cover 20 and allows air to escape from the proppant reduction cover 20 during material transfer operations. One or more slots 42 may be formed in the weather cover 40 to speed the exhaust of air during material transfer. The weather cover 40 may be attached to the lip of a vent hatch 12 using a ratcheting strap tightener, magnets, hook and loop material or other suitable fastening device. The weather cover 40 may incorporate one or more viewing windows (not shown) to allow workers to monitor proppant levels during material transfer.

Figure 7A:
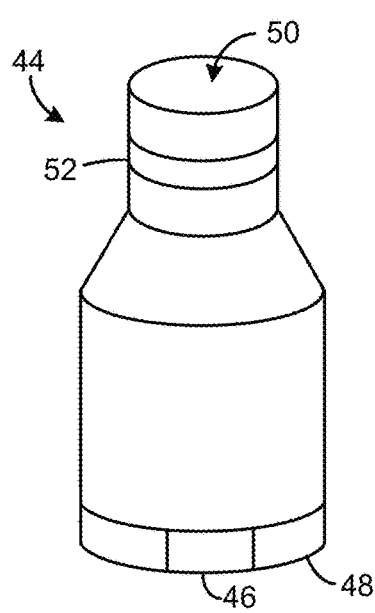
FIG. 7A is an isometric depiction of a vacuum adapter.

FIG. 7A depicts a vacuum adapter 44, which may be placed onto one or more of the proppant storage trailer vent hatches 12. The lower portion 46 of the vacuum adapter 44 fits over and is secured to the lip of the vent hatch 12; while a cylindrical shape is shown for the vacuum adapter 44, it will be understood that the shape of same can be made as necessary to comport to the shape of the vent hatches. One or more straps (not shown) may be inserted into strap loops 48 sewn around the perimeter of the vacuum adapter 44. In FIG. 7A the strap loops 48 are sewn at intermittent intervals around the vacuum adapter 44, but the strap loops 48 may be sewn around the entire vacuum adapter 44 to form a sleeve. The ends of the straps may be fastened together using quick release buckles or other fastener mechanisms. A flexible gasket material may be attached to the inner lip of the lower edge 46 of the vacuum adapter 44 to help create a stronger seal around the vent hatch 12. In one embodiment the flexible gasket material may be synthetic wool, but other appropriate materials may be used. The vacuum adapter 44 can be constructed of an impermeable, waterproof material, a filter fabric or other suitable material. The upper portion of the vacuum adapter 44 forms an aperture 50 adapted to fit over a vacuum hose (not shown). When a vacuum hose is inserted into the aperture 50, a hose clamp 52 or other suitable fastener device can be used to secure the vacuum adapter 44 to the vacuum hose. Negative pressure may be applied to the vacuum hose to allow workers to more easily view the contents of the storage trailer.

Figure 7B:
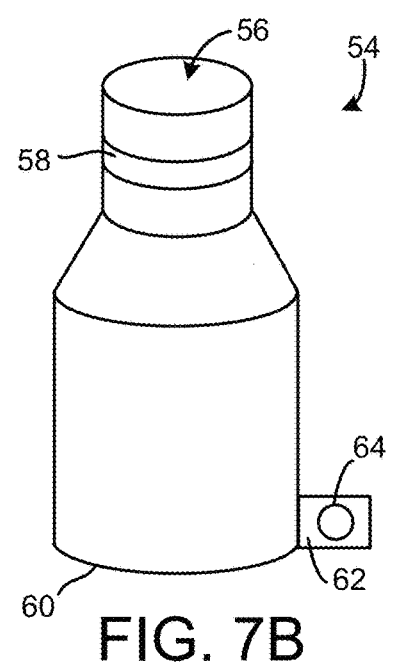
FIG. 7B is an isometric depiction of a vent (exhaust) sock.

FIG. 7B depicts a vent sock 54 that may be used in conjunction with the proppant reduction cover 20. The vent sock 54 can be made of a permeable filter material adapted to release the pressurized air created when proppant is loaded into the frac sander 10 while preventing dust from escaping. The vent sock 54 of FIG. 7B is cylindrically shaped and a circular aperture 56 at the top of the vent sock 54 and is sized to fit around the lip of a circular valve or vent. A strap loop 58 is sewn into the vent sock 54 below the aperture 56 to retain a ratchet fastened strap (not shown) to firmly secure the vent sock 54 to a circular inlet of a valve or vent. Other fastener mechanisms including but not limited to cam-lock straps, buckle tie-downs, quick-connect straps or bungee straps may be used to secure the vent sock 54 to the frac sander 10. Flexible gasket material may be attached to the inner lip of the circular aperture 56 to help create a stronger seal around the vent. In one embodiment the flexible gasket material may be synthetic wool, but other appropriate materials may be used.

Figure 8:
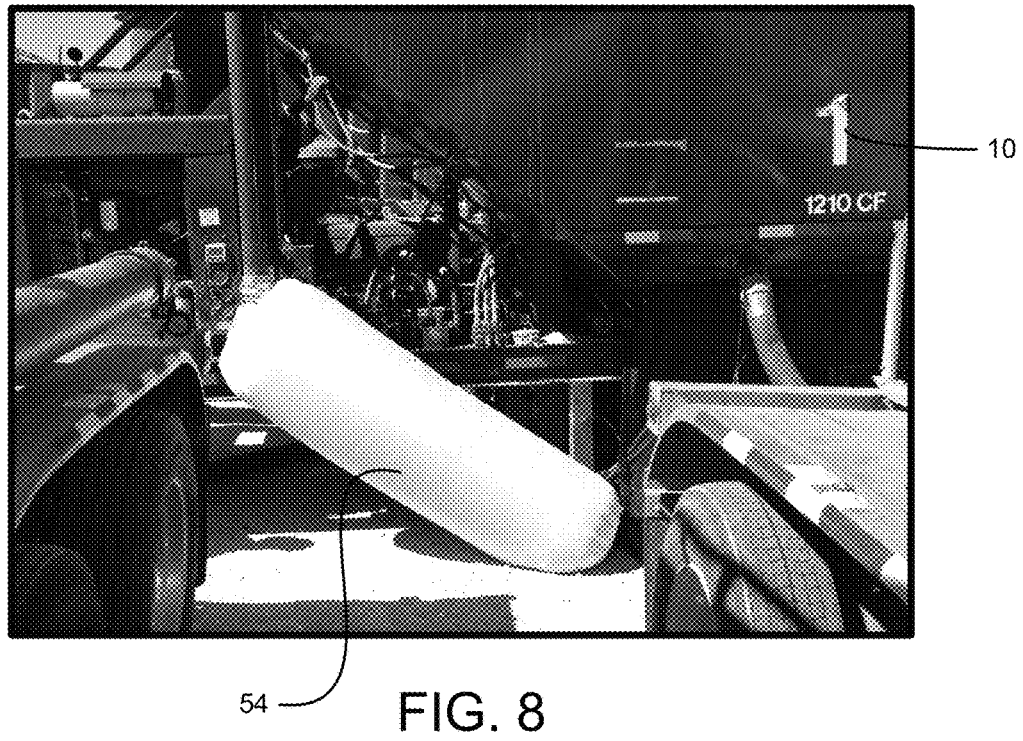
FIG. 8 shows a photographs of a vent sock attached to a frac sander.

As proppant is loaded into the frac sander 10, dust escaping the valve or vent will enter and be retained in the vent sock 54. A zipper 60 is sewn into the bottom of the vent sock 54 to facilitate applying or removal of the vent sock 12. One or more tether tabs 62 with grommets 64 may be attached to the vent sock 54 to allow staking of the vent sock 54 to the ground or other stable surface. FIG. 8 shows a photograph of vent sock 54 attached to the frac sander 10.

Figure 9:
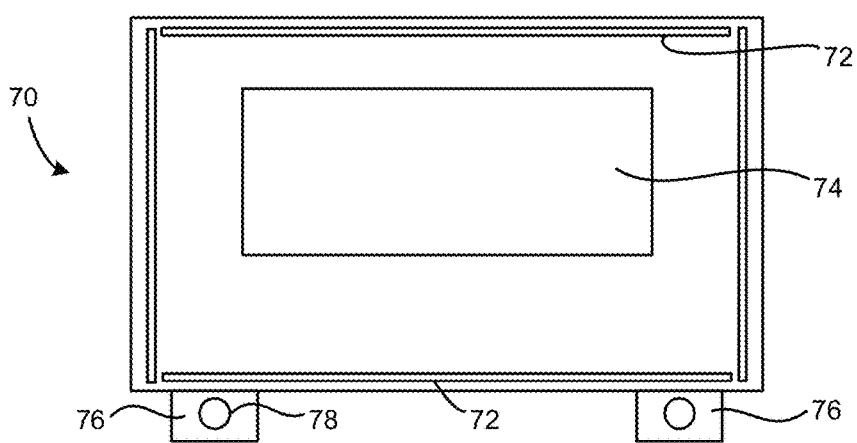
FIG. 9 is an elevational view of a trailer skirt.

FIG. 9 depicts a trailer skirt 70 that is used to reduce airborne dust from the frac sander 10. Once proppant is loaded onto the frac sander 10 the proppant is then used in a fracking process. Proppant flows out of valves at the bottom of the frac sander 10 onto a conveyor belt underneath the frac sander 10. To reduce the amount of airborne dust generated during this process, trailer skirts 70 can be attached to the side of the sander 10. The trailer skirts 70 are shaped to fill in the space between the side of the frac sander 10 and the ground. The trailer skirt 70 in FIG. 9 is rectangular, but other shapes including but not limited to triangles may be used to adjust to frac sanders 10 that are inclined. In one embodiment, the skirts 70 are made of an impermeable, waterproof material, but other suitable materials may be used. A series of magnets 72 are sewn into the edges of the skirt 70 to facilitate attachment to the metallic members of the frac sander 10 and to other skirts 70. Additionally, hook and loop fasteners or other suitable fasteners may be used to attach the trailer skirt 70 to another skirt. A clear viewing window 74 may be incorporated into the trailer skirt 70 to allow workers to observe the flow of proppant onto the conveyor. One or more tether tabs 76 with grommets 78 may be attached to the trailer skirt 70 for staking the skirt to the ground.

Figure 10:
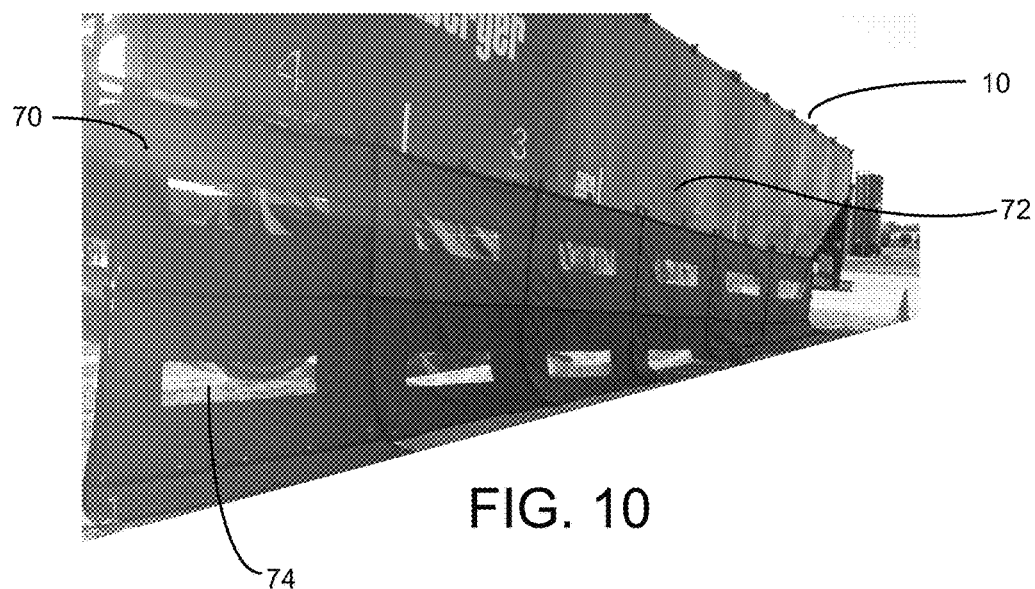
FIG. 10 is a photograph of a series of trailer skirts installed on a frac sander.

FIG. 10 is a photograph of a series of the trailer skirts 70 attached to the side of the frac sander 10 using the magnets 72. The magnets 72 and strips of hook and loop fasteners are used to attach the skirts 70 to one another. Workers attach the trailer skirts 33 to the sander 10 until the conveyor belt is completely surrounded by the trailer skirts 70. The bottom of the trailer skirts 70 are attached to the ground using stakes.

Figure 11:
FIG. 11 is a photograph of a stinger cover installed on a frac sander stinger.

As mentioned above, the stinger 16, shown in FIG. 11, is a moveable, articulated conveyor that transfers proppant into a sand blender. Proppant flows onto the stinger 16 that is provided with a stinger cover 80 to capture dust generated by the transfer of proppant from the stinger 16 to the pod hopper machine. In the embodiment of the stinger cover 80 shown in FIG. 11 it is roughly rectangular in shape and is adapted to fit over the top of the stinger 16. A series of viewing windows 82 in the stinger cover 80 allow workers to view proppant moving along the stinger 16. In one embodiment, the stinger cover 80 is made of an impermeable, waterproof material that is advantageous because it contains dust that is generated by the transfer of proppant and it also allows for the transfer of proppant in the rain, which is difficult when the stinger 16 is uncovered. The stinger cover 80 attaches to the frame of the stinger 16 using a series of magnets 84 sewn into the stinger cover 80. A series of grommets 86 may also be incorporated into the stinger cover 80. The stinger cover 80 may be comprised of separate panels secured together using magnets, hook and loop fasteners or other suitable fasteners. Weights (not shown) may be incorporated into the bottom edge of the stinger cover 80 to help it remain stationary on the stinger 16.

Figure 12:
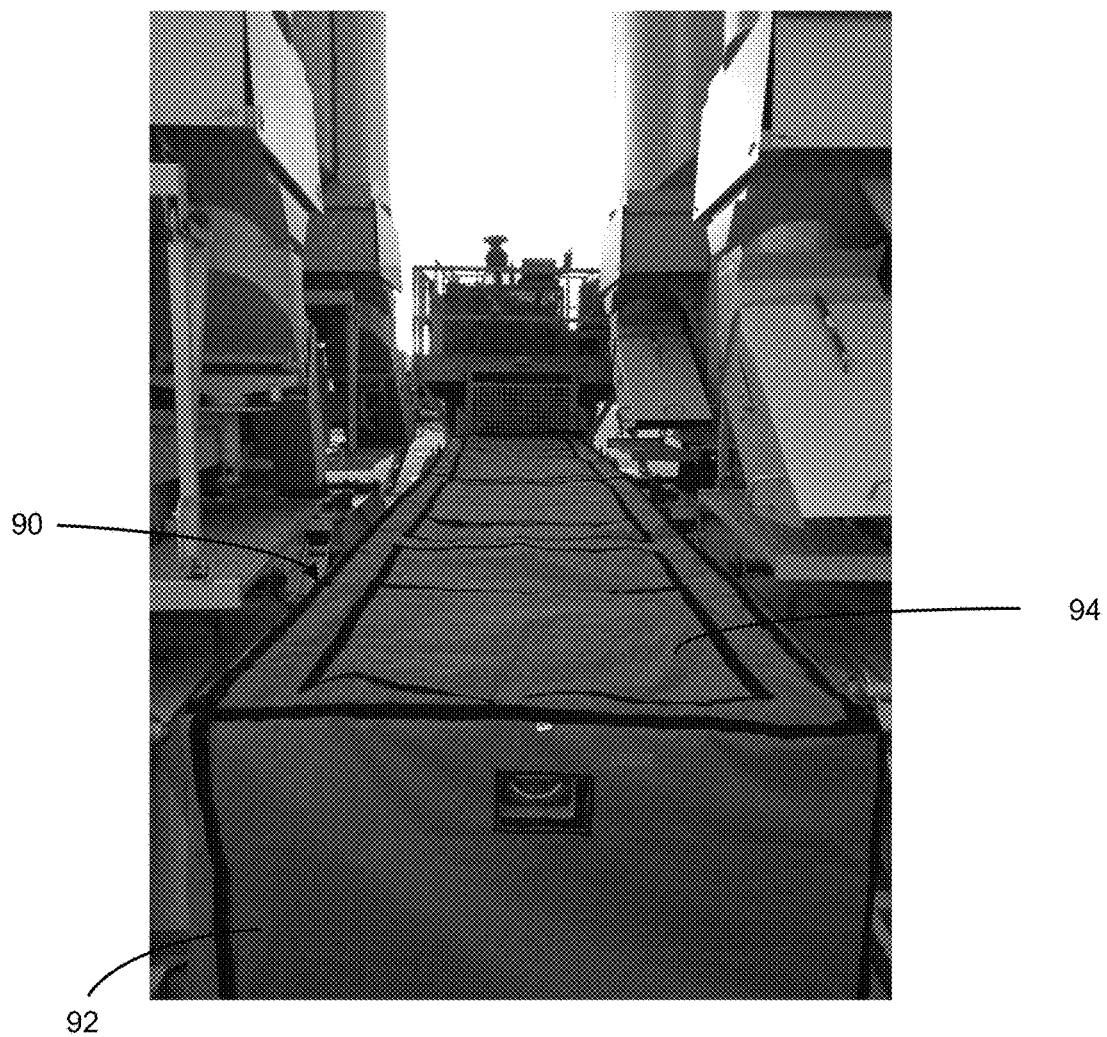
FIG. 12 is a photograph of a T-belt cover.

In some embodiments, the stinger 16 is replaced by a T-belt conveyor 90, as depicted in FIG. 12, which transfers proppant. In these embodiments, a T-belt cover 92 is used to minimize the emission of dust from the T-belt conveyor 90. FIG. 12 is a photograph of the T-belt cover 92 installed on the T-belt conveyor 90. The T-belt cover 90 is comprised of waterproof material that prevents the dust from escaping and keeps the proppant dry. Visibility windows 94 are incorporated into the T-belt cover 92 so operators can view the speed of the conveyor belt and the amount of proppant that is being transferred into a sand blender.

Figure 13A:
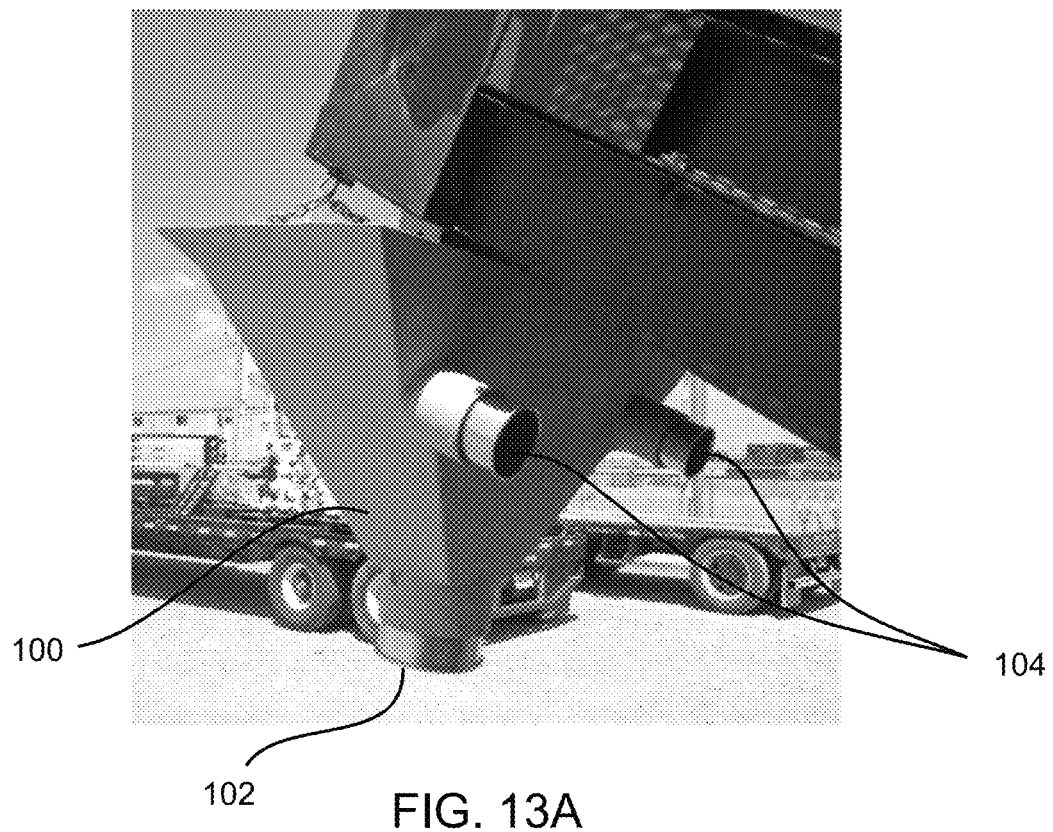
FIG. 13A is a photograph of one type of sand catcher.

FIG. 13A depicts a sand catcher 100 in accordance with some embodiments. The sand catcher 100 forms a basin that is configured to receive proppant that spills from the end of the conveyor on a stinger 16 or T-belt conveyor 90. The bottom end of the sand catcher 100 incorporates one or more tubing attachment points 102. Tubing (not shown) may be connected to the attachment point 102 to receive sand particles that spill from the conveyor. The spilled sand can be fed through the tubing to a vent sock (not shown) or other suitable receptacle. The sand catcher 100 also incorporates one or more vacuum tubing attachment points 104. Vacuum tubing (not shown) may be attached to the vacuum tubing attachment points 64 to extract dust that spills from a conveyor.

Figure 13B:
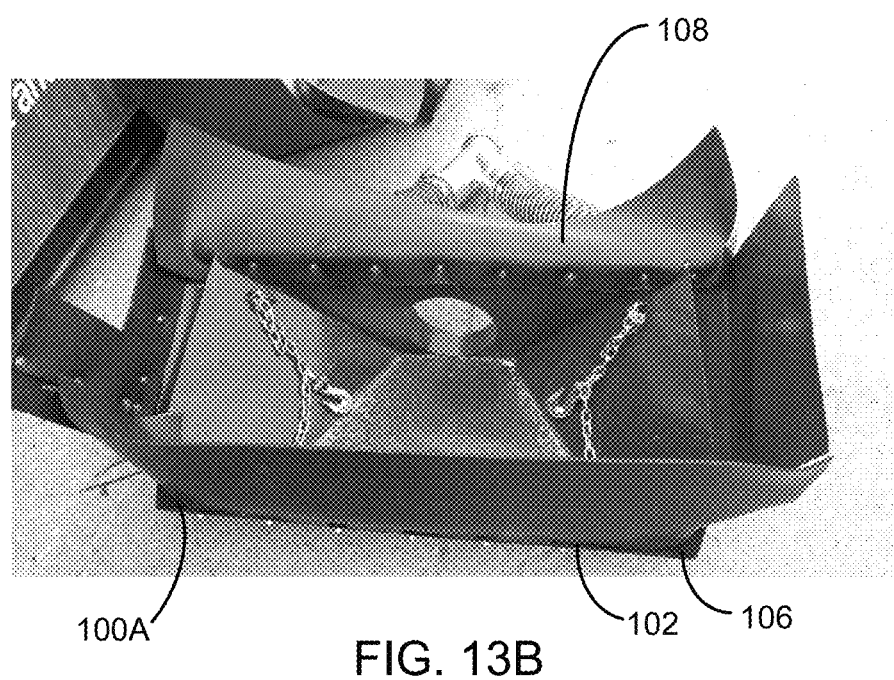
FIG. 13B is an interior photograph of another type of sand catcher.
Figure 13C:
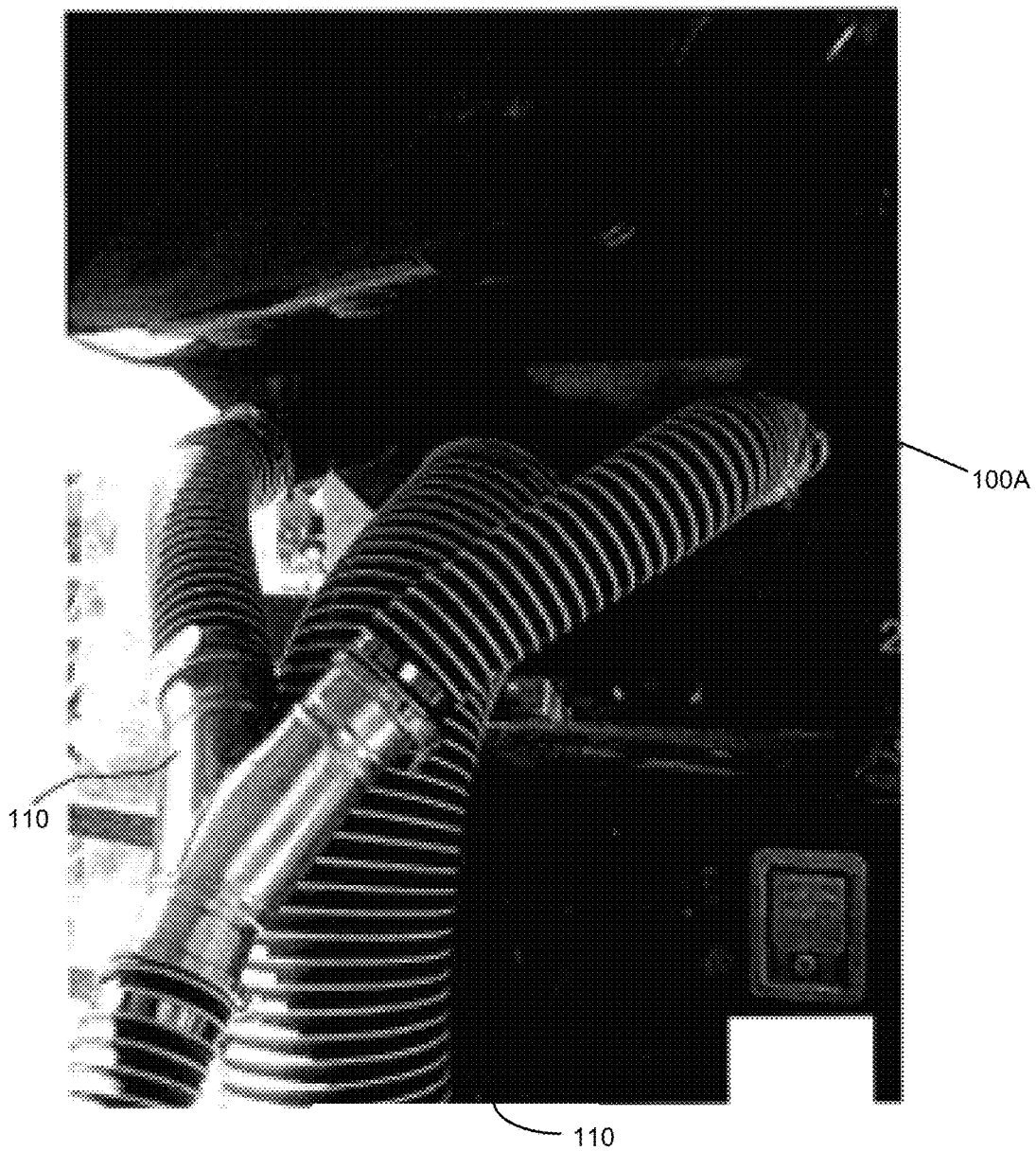
FIGS. 13C and 13D show the sand catcher of FIG. 13B in an installed orientation.
Figure 13D:
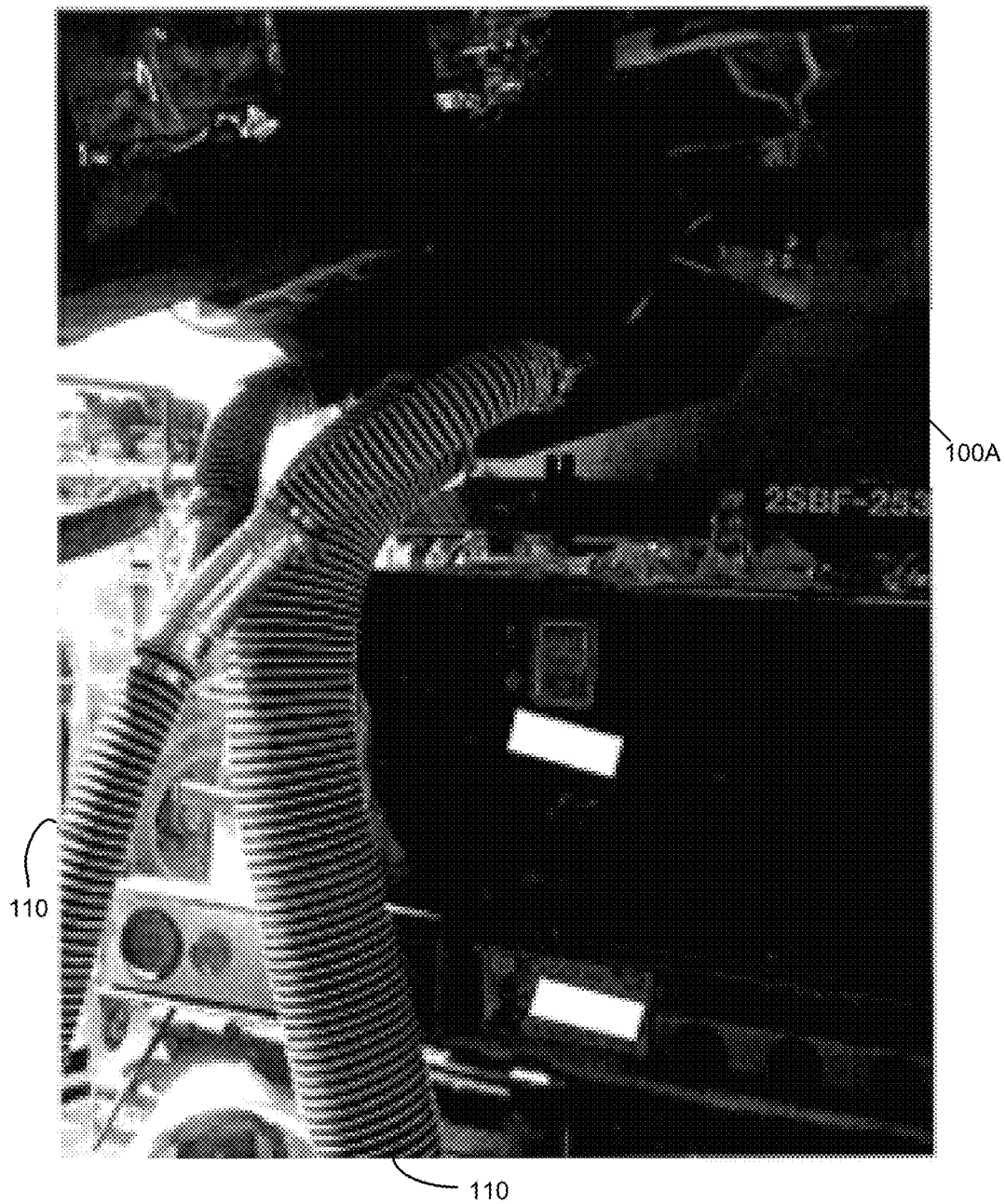

FIG. 13B depicts the interior of another sand catcher 100A. Inner walls 106 separate the vacuum tubing attachment points 104 to permit the extraction of dust particles via vacuum without extracting larger sand particles. Larger sand particles flow through the tubing attachment point 102, which is connected to the main volume of the sand catcher 100A's interior. Flexible gaskets may be attached to the upper edge of the sand catcher 100 to facilitate a better seal between the sand catcher 100 and a conveyor. One or more chains 108 may be attached to the interior of the sand catcher 100A so it can be connected to the frame of a stinger 16 or T-belt conveyor 90. External connection hoses 110 are shown in FIGS. 13C and 13D. The central hose may be a gravity fed (or vacuum assisted) hose that collects larger, heavier proppant materials that collect within the basin (bowl). The outside hoses are connected to vacuum lines and collect airborne proppant from the vicinity of the sand catcher 100 or 100A. Referring again to FIG. 13B, interior baffles (side walls) form chambers that enable the airborne contaminants to be drawn down and out of the sand catcher.

Figure 14:
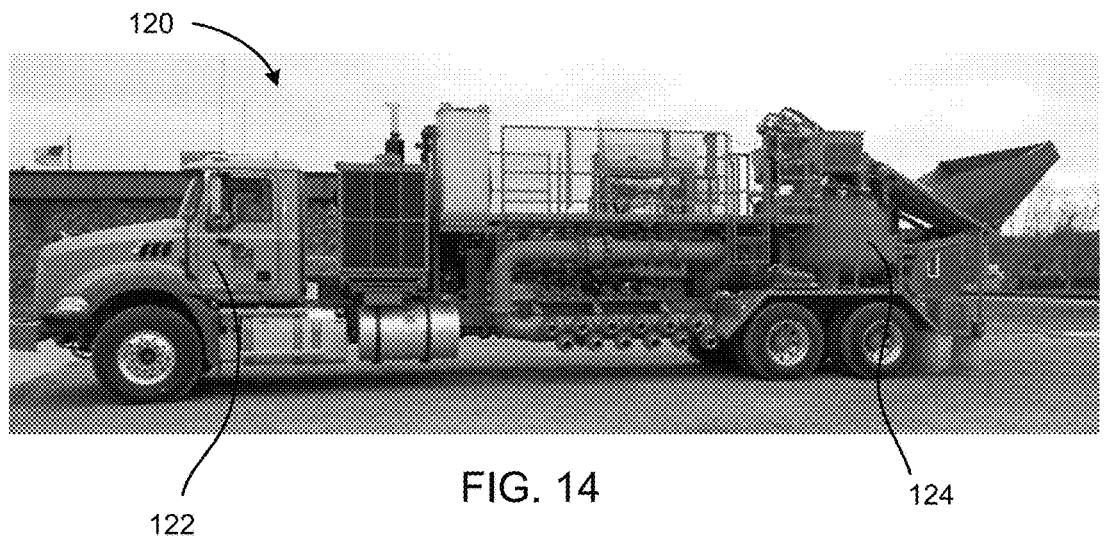
FIG. 14 is a perspective view of a sand blender truck
Figure 15:
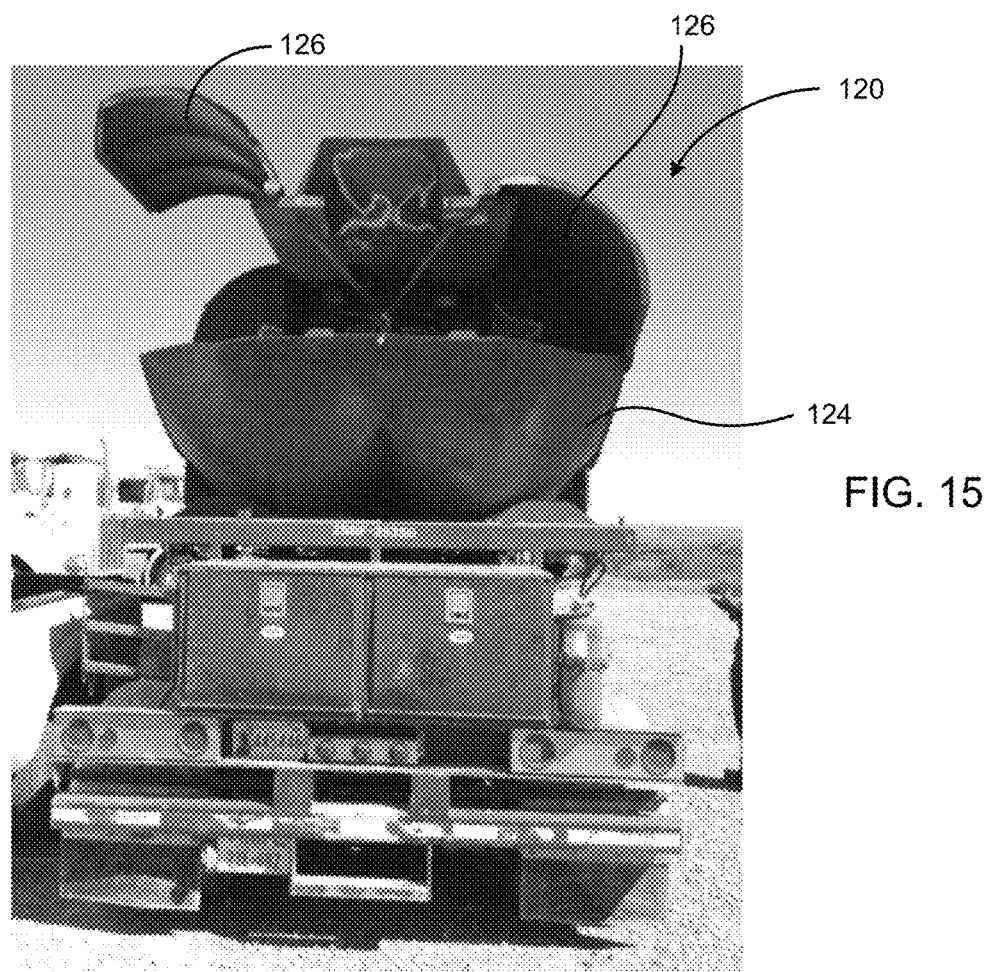
FIG. 15 depicts the rear of a sand blender truck and pod hopper.

FIG. 14 is a photograph depicting one embodiment of a sand blender 120. The sand blender 120 is mounted on a truck 122, and includes a pod hopper 124 at the rear of the sand blender 120. FIG. 15 depicts the rear end of another embodiment of a sand blender 120. In this embodiment, pod hoods 126 are attached above the pod hopper 124. When the sand blender 120 is in use, proppant is transferred from a storage trailer stinger conveyor (not pictured) into the pod hopper 124. The transfer of proppant generates large amounts of silica dust. The sand blender dust containment system, or filtering and containment system, is designed to control the emission of this dust and is comprised of a pod cover, upper pod panels, and lower pod panels.

Figure 16A:
FIGS. 16A-16C show various photographs of a pod along with a pod cover.

FIG. 16A is a photograph of a pod cover 130 mounted on the pod hood 126 while proppant is being transferred. The pod cover 130 is made of an impermeable, waterproof material and is shaped to closely fit the top of the pod hopper 124. The shape may vary to fit different brands or embodiments of sand blenders 120. A series of magnets 132 are sewn into the edges of the pod cover 130 to securely attach it to the top of the pod hopper 124. Strips of hook and loop fastener 134 may be attached around the perimeter of the pod cover 130 to facilitate attachment to other components of the sand blender dust containment system.

Figure 16B:
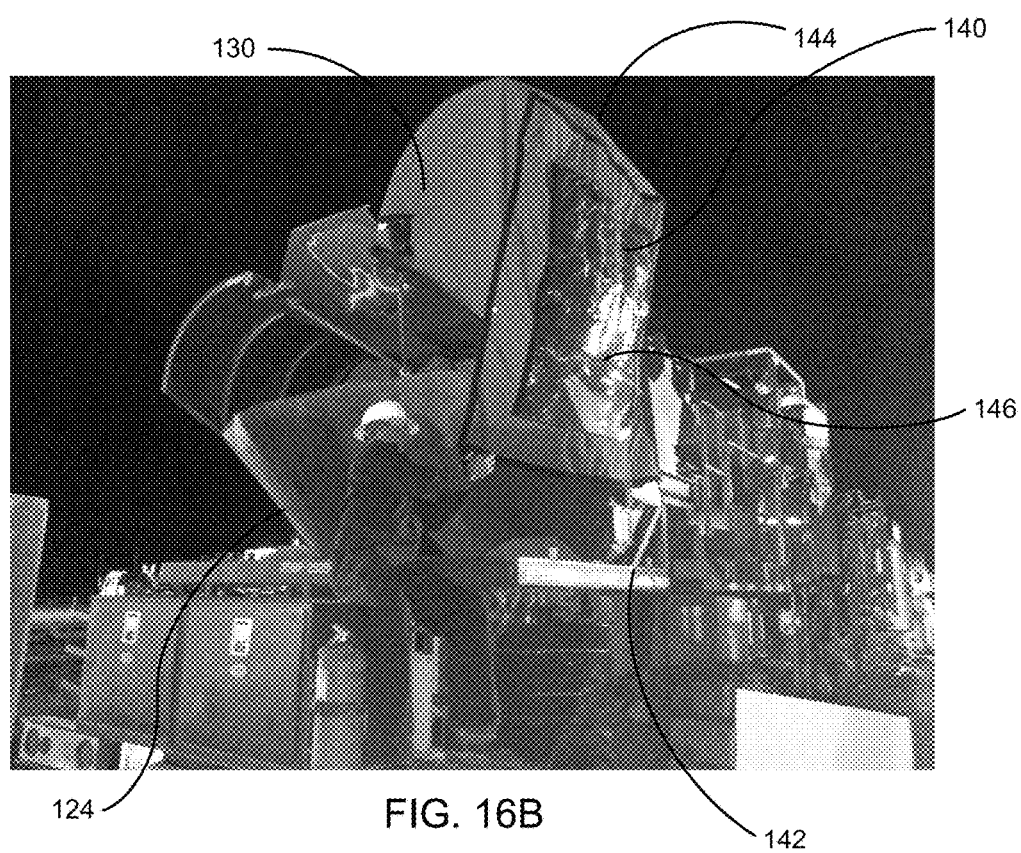
Figure 16C:
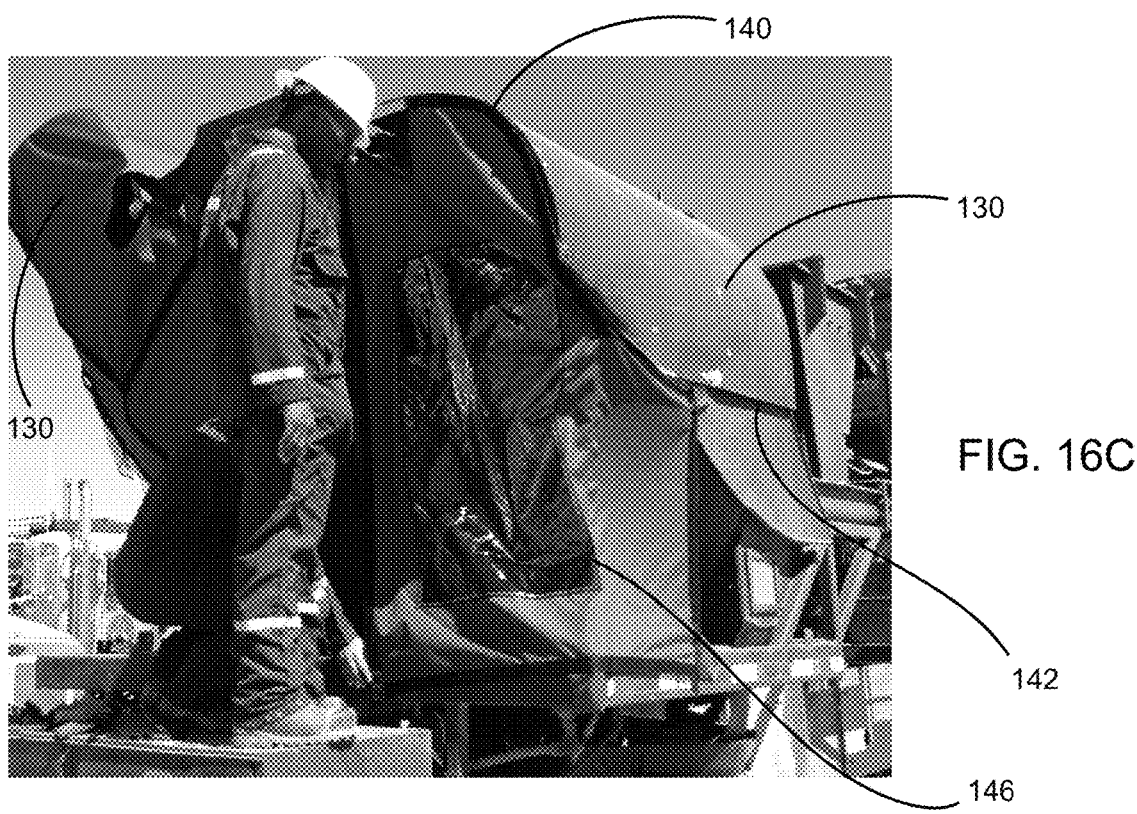

As depicted in FIG. 16B, upper pod panels 140 attach to the pod cover 9 to prevent dust from escaping from the side of the pod hopper 124. FIG. 16B is a photograph of one upper pod panel 140 attached to a pod cover 130. The upper pod panels 140 are made of impermeable, waterproof material. The upper pod panel 140 is rectangular in this embodiment, but other shapes and configurations may be used to adapt to different brands or embodiments of sand blenders 120. A series of magnets 142 are sewn into the edges of the upper pod panel 140 to securely attach the upper pod panel 140 to the metallic pod hopper 124. Strips of hook and loop fastener 144 may be affixed around the perimeter of the upper pod panel 140 to facilitate attachment to other components of the sand blender dust containment system 120. Depending on the shape of the pod hopper 124, multiple upper pod panels 140 may be used to keep dust from leaking out of the pod hopper 124. One or more clear viewing windows 146 may be incorporated into the upper pod panel 140 to allow workers to observe proppant in the pod hopper 140. FIG. 16C depicts another embodiment of the upper pod panel 140 with a slightly different shape.

Figure 17A:
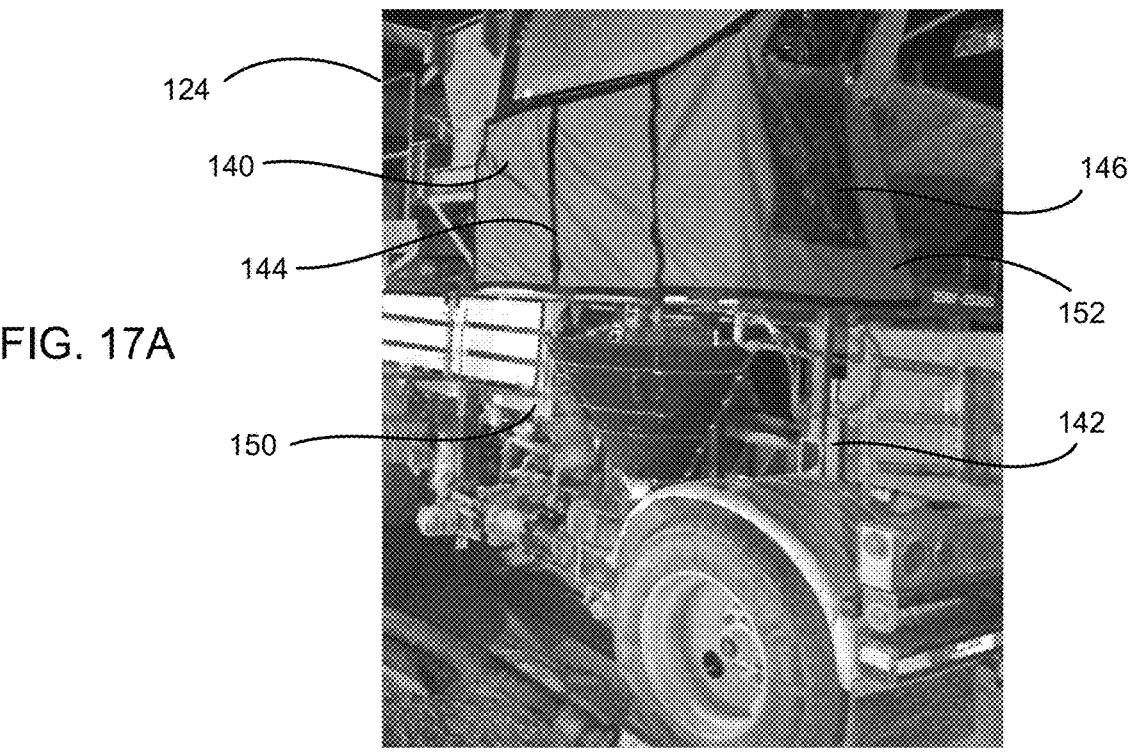
FIG. 17A shows a lower pod.
Figure 17B:
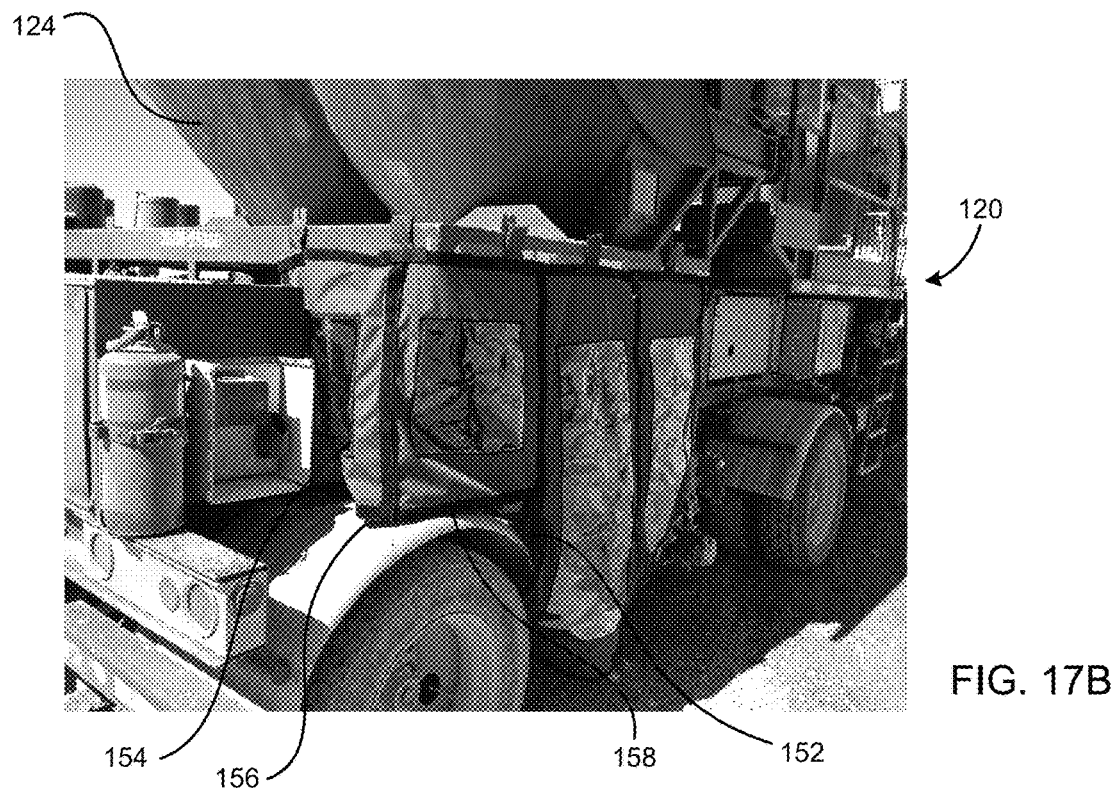
FIG. 17B shows the lower pod covered by a lower pod cover.

FIG. 17A depicts a lower hopper 150 that is located below the pod hopper 124. The lower hopper 150 is another location where dust is emitted while the sand blender 1 is in use. FIG. 17B is a photograph of lower pod panels 152 used to contain dust emitted from the lower hopper 150. Lower pod panels 152 attach to the sand blender 10 to prevent dust from escaping from the lower hopper 23. The lower pod panels 152 are made of impermeable, waterproof material. The lower pod panels 152 are rectangular in this embodiment, but other shapes and configurations may be used to adapt to different brands or embodiments of sand blenders 1. A series of magnets 154 are sewn into the edges of the lower pod panels 152 to securely attach the lower pod panels 152 to the metallic surfaces surrounding the lower hopper 150. Strips of hook and loop fastener 156 may be affixed around the perimeter of the lower pod panels 152 to facilitate attachment to other components of the sand blender dust containment system. Depending on the shape of the lower hopper 150, multiple lower pod panels 152 may be attached to one another to keep dust from leaking out of the lower hopper 150. One or more clear viewing windows 158 may be incorporated into the lower pod panels 152 to allow workers to observe proppant in the lower hopper 150. The bottom edge of the lower pod panels 152 may be weighted, and a series of grommets (not shown) may be incorporated around the perimeter of the lower pod panels 152 to allow the panels to be staked down or tied together.

Figure 18:
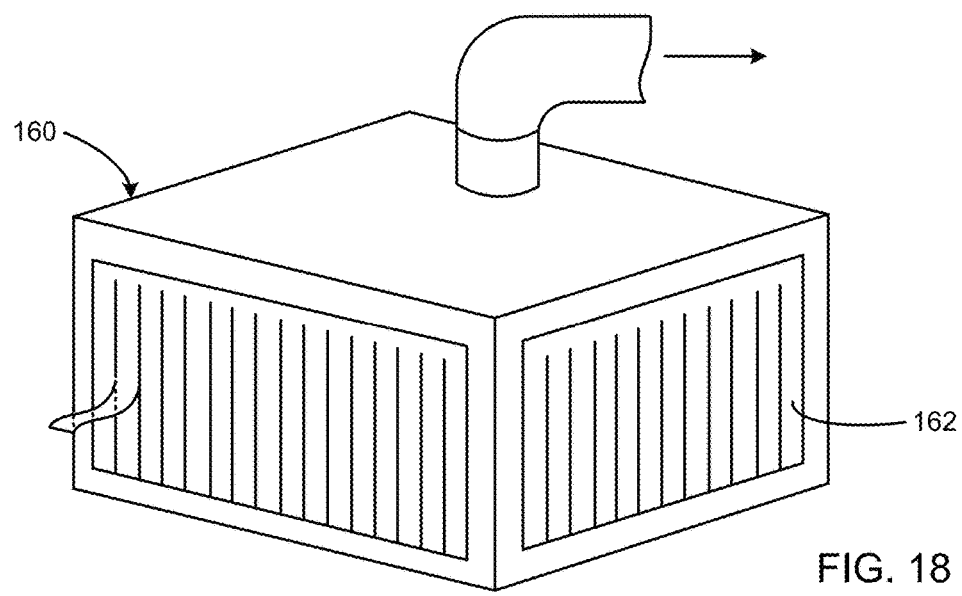
FIG. 18 is a simplified schematic depiction of an upper pod cover.

FIG. 18 is a schematic depiction of a pod cover 160 similar to the pod cover 130 discussed above. The pod cover 160, also referred to herein as a blender cover, is shown to have a rectangular shape for clarity, but can be shaped to conform to the curvilinear or other shape of the upper pod hopper 124. Windows 162 are formed of slitted transparent material, such as strips of plastic or other flexible material which hang as a curtain so that the strips are attached at an upper end and are separated at a lower end. The windows 162 allow an operator to view into the interior of the upper pod during a blending operation. The windows further allow one or more of the stingers 16 to inject proppant material into the upper pod hopper 124. The windows 162 normally hang down as shown to nominally seal the upper pod hopper 124 (a "first orientation"), but are easily displaced (opened or otherwise deflected to the side) adjacent the distal end of the stinger 16 ("second orientation"), thereby allowing any suitable number of stingers to transport proppant to an upper pod hopper 124 at a time.

Figure 19A:
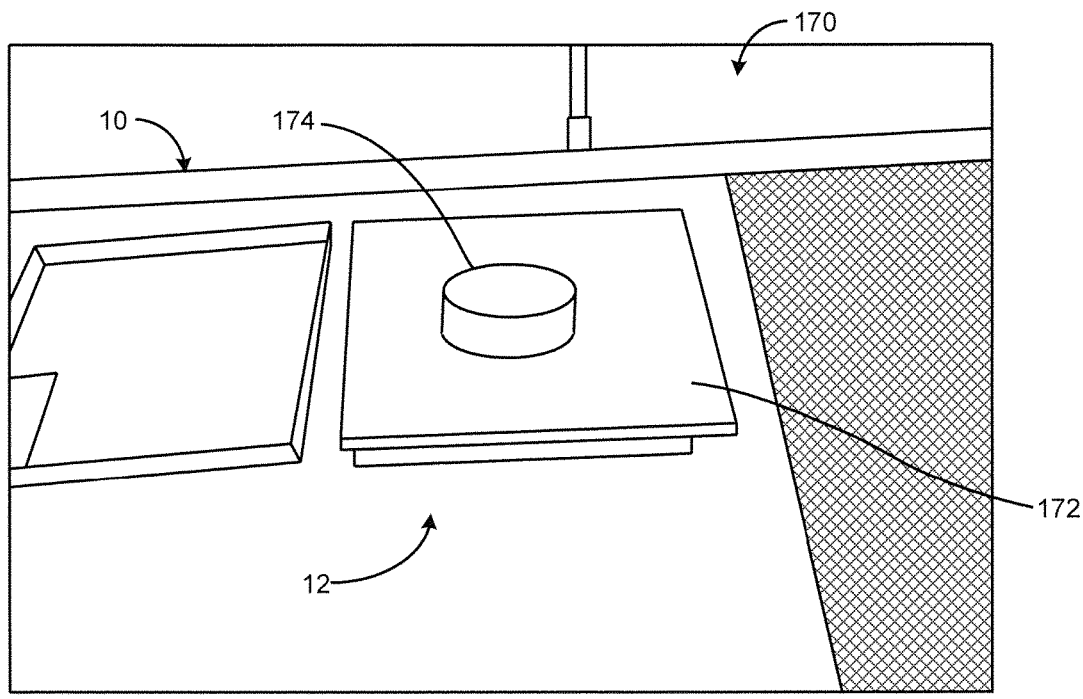
FIG. 19A shows a depiction of a photograph of a vent cover.
Figure 19B:
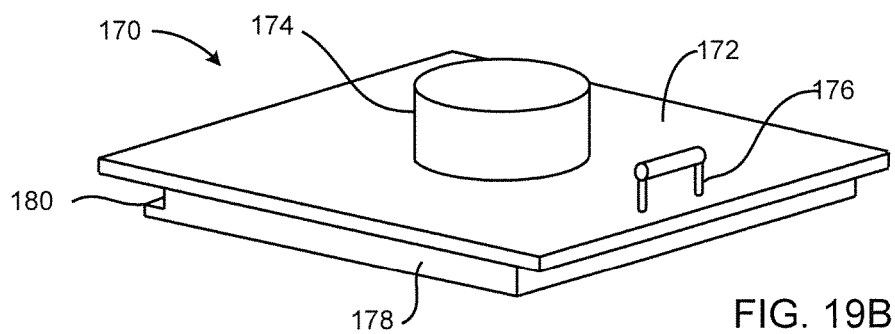
FIGS. 19B and 19C show schematic depictions of the vent cover of FIG. 19A.
Figure 19C:
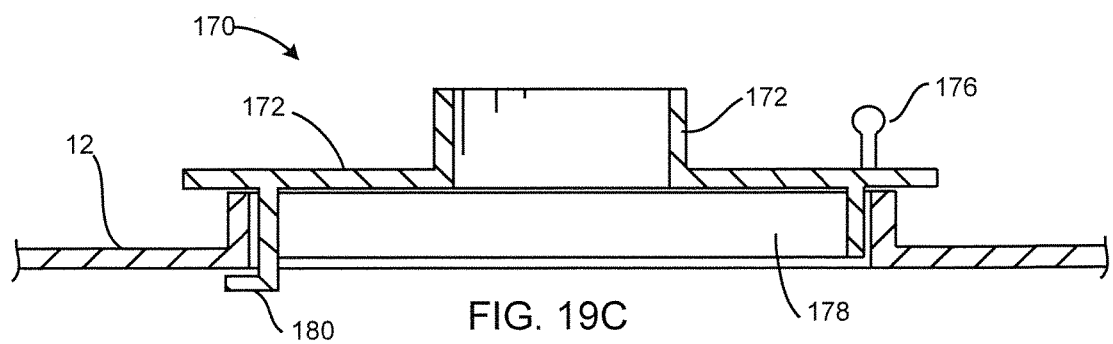

FIG. 19A is a depiction of a photograph of a vent cover 170 in accordance with further embodiments. The vent cover 170 is sized for placement over a vent hatch 12 (see FIG. 1). FIGS. 19B and 19C show the vent cover 170 in accordance with some embodiments. The vent cover 170 generally comprises a vent plate 172 that is slightly larger than the opening of the vent. Extending upwardly from the vent plate 172 is a central port 174 adapted to receive an adapter, such as the vacuum adapter 44 of FIG. 7A. A handle 176 allows an operator to manipulate the vent cover 170.

A rectangularly shaped projection 178 extends downwardly from the plate 172. The projection 178 is sized to fit within the vent aperture 12 in the proppant storage vessel 1. As shown in FIG. 19C, a rearward edge of the projection 178 can include a hook flange 180 sized to fit under a lower lip of the vent hatch 12. This facilitates retention of the vent cover 170 over the vent hatch 12. Although not shown, other embodiments can be used with additional locking features to secure the vent cover 170 to the vent hatch 12.

Figure 19D:
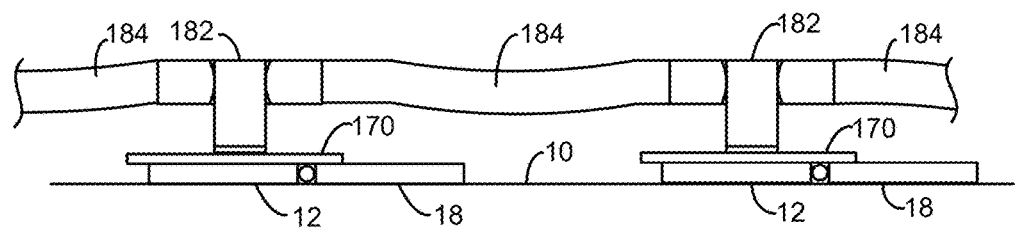
FIG. 19D shows the vent cover of FIGS. 19A-19C in combination with a t-shaped adapter and vacuum lines.

FIG. 19D shows a sequence of the vent covers 170 in combination with t-shaped metal adapters 182 interconnected with flexible vacuum lines 184. This arrangement allows vacuum (negative) pressure to be supplied to multiple vent hatches 12 in succession.

Figure 20A:
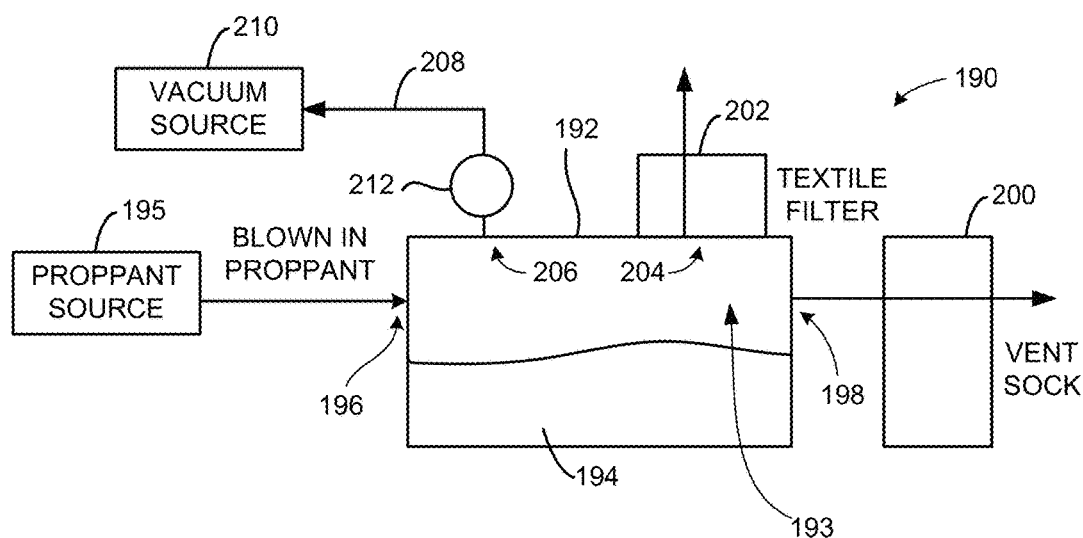
FIG. 20A is a schematic depiction of a blow-in process.

As noted above, the various embodiments of the present disclosure provide contaminant suppression during both blow-in processing and blending processing. Generally, blow-in processing involves the filling of a proppant storage vessel with proppant for subsequent use during a fracking operation. As will be recognized by those skilled in the art, at a well site it is common for proppant to be delivered from time to time using trucks or other delivery mechanisms to refill the proppant storage vessel(s) maintained at the well site so that fracking fluid can be generated on demand in sufficient quantities as needed. FIG. 20A represents aspects of some embodiments that can be used during a blow-in process 190 to prevent or reduce the generation of airborne contaminants.

FIG. 20A shows a schematic representation of a proppant storage vessel 192 having an interior volume (space) 193 that is filled with proppant 194 in accordance with the foregoing discussion. As discussed above, the proppant 194 may be supplied from a truck or other delivery system (proppant source 195) and may be blown into the interior volume 193 of the proppant storage vessel 192 through an inlet port 196 using a pressurized system of the source. An exit port 198 is coupled to a vent sock 200 similar to the vent socks 54 discussed above. The vent sock 200 collects proppant 194 that exits the proppant storage vessel 192 and helps to regulate the interior pressure.

A textile filter 202 (as discussed above in FIGS. 3-5) can be mounted to another vent 204. The textile filter 202 allows pressure introduced within the vessel to escape while retaining airborne proppant. Another vent 206 is coupled to a vacuum line 208, such as discussed above in FIGS. 19A-19D, to supply negative pressure (vacuum) from a vacuum source 210. One or more pressure regulating valves, such as represented by valve 212, may be integrated in the line adjacent the vent 206 to further regulate the pressure within the vessel.

Proppant vessels such as 192 tend to have two hatch vent apertures (such as represented by 204, 206) on a top surface of the vessel and at least one side vent aperture (such as represented by 198) on a side surface of the vessel. In such cases, it is contemplated that the textile filter 202 can be affixed to one of the two hatch vent chambers 204, the vacuum attachment (including line 208) can be attached to the remaining one of the two hatch vent apertures 206, and the vent sock 200 can be attached to the side vent aperture 198.

As proppant 194 is rapidly introduced into the interior volume 193 of the vessel 192, the air within the vessel will tend to be displaced. A first positive airflow path is established through the textile filter 202 and a second positive airflow path is established through the vent sock 200 to allow the entrapped air to escape the interior volume 193. Clearly, a rapid introduction of the proppant will tend to generate a significant amount of airborne proppant within the chamber, so that the filter elements 200, 202 will tend to facilitate passage of air while substantially retaining the airborne proppant.

In some cases, the airflow rates supplied by the filter elements 200, 202 will be sufficient to allow the filling of the interior volume 193 at substantially any desired flow rate. That is, the displaced air can exit through these elements at a sufficient rate to not substantially impede the flow of proppant via backpressure buildup within the interior chamber. Further efficiencies in the flow of the proppant 194 into the interior volume 193 can be obtained through the use of the negative pressure (vacuum) supplied by source 210.

It has been found that an arrangement such as shown in FIG. 20A using the various elements discussed above can maintain the interior pressure of the proppant storage vessel 192 in the range of from about 8 pounds per square inch (psi) to about 10 psi, even if the delivery system is providing the inlet proppant at a higher pressure, such as around 15-20 psi or more. The interior pressure of the volume 193 can be easily regulated such as through adjustment of the one or more valves 212 to maintain an optimum flow rate into the vessel 192.

Using the hybrid arrangement of both passive filtering by the textile filter and the vent sock and the active vacuum has been found to provide significantly improved refill times while reducing damage due to sandblasting and other effects. The various embodiments presented herein can thus extend the service life of the equipment used during fracking operations, speed up the blow-in process thereby reducing delays in the generation and application of the fracking fluid, and reduce exposure of nearby personnel to airborne contaminants.

A related advantage associated with the hybrid approach (e.g., both positive pressure outlet filters and negative pressure vacuum) is that the system is largely impervious to environmental effects. Depending on the construction of the filter media, inclement weather such as rain, snow, ice, etc. can affect the effective flow rates through the filter media as water, ice, etc. are absorbed or otherwise build up on the filter media. The vacuum can thus further ensure that a proper interior pressure is maintained even if the flow through characteristics of the filter media have been impeded, enabling delivery personnel to offload the proppant in an expeditious manner.

Another advantage of the hybrid approach is that the filter media (e.g., elements 200, 202) are not generally exposed to significantly high enough pressures (e.g., above 10 psi, etc.) that might cause the filters to be ejected from the vessel 192 or otherwise open a standby overpressure flap, etc. Thus, the hybrid approach can tend to reduce particulate generation and exposure while increasing the efficiency of the blow-in process.

Figure 20B:
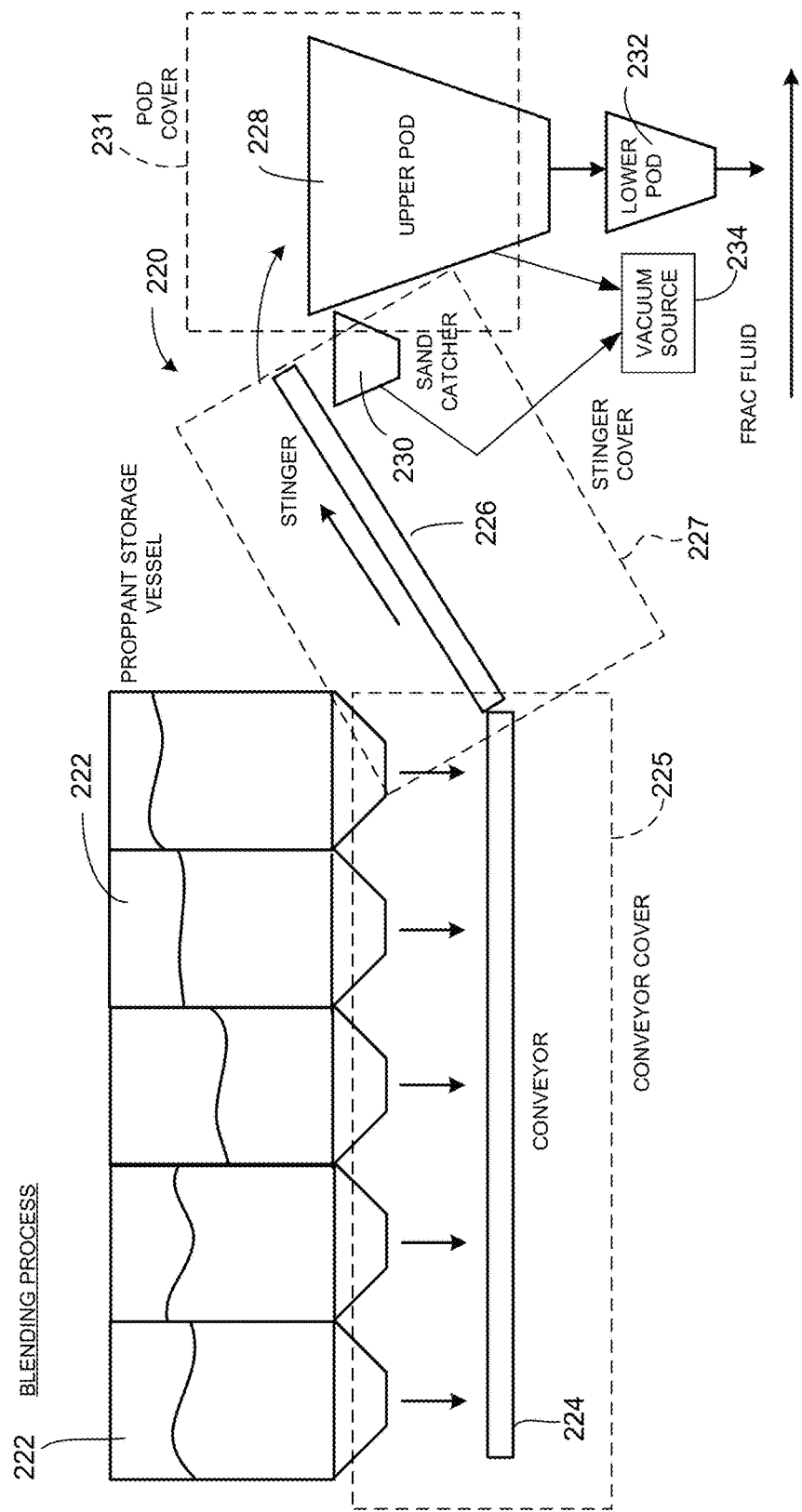
FIG. 20B is a schematic depiction of a blending process.

As noted above, various embodiments of the present disclosure can further provide reduced airborne particulate generation and exposure during so-called blending processing, in which the proppant material is transported for mixture with suitable fluids to form a fracking fluid to be pumped down into a well. FIG. 20B is a schematic representation of a blending process 220 carried out in accordance with the foregoing discussion. It will be understood that the blending process 220 of FIG. 20B can be carried out during the blow-in process as shown in FIG. 20A, or can be performed at the conclusion of the blow-in process.

A typical frac trailer 10 may include a number of different interior chambers (vessels) 222 each storing a different form or type of proppant. It will be noted that each of these interior chambers can be sequentially or concurrently loaded as described above in FIG. 20A.

During the blending processing, valves are activated to allow controlled amounts of each of the proppants to exit, such as via gravity feed from the interior chambers 222, and fall onto a conveyor 224. Covers 225 can be applied to the edges of the lower portions of the trailer as discussed above to reduce airborne contamination from the dispensed proppant.

The proppant is conveyed to a stinger (or stinger conveyor) 226 which may also be covered as discussed above by a stinger cover 227. The stinger 226 directs the proppant into an upper pod 228 (blender) where the proppant is mixed. A sand catcher 230 may be arranged at the distal end of the stinger 226 as discussed above, and a cover 231 may be placed over the upper pod to receive and contain the high speed ejection of the proppant from the stinger into the pod.

The mixed proppant is directed to a lower pod (blender) 232 which injects the solid proppant into a frac fluid, and as discussed above, may include a number of fluidic components. The admixture of the frac fluid and the proppants is thereafter pressurized and directed down a well bore for use during a fracking operation. As noted above, the lower pod 232 may also be supplied with a suitable cover as desired.

In at least some embodiments, the pod cover 231 is provided with curtained, spaced apart flexible members as mentioned previously to allow placement of the sand catcher 230 and the end of the stinger 226 proximate the pod 228 (see e.g., FIG. 18). Because the pod may be mounted to a separate piece of equipment (e.g. a mixing truck, etc.), the actual height and approach angle of the stinger may vary relative to the pod. The flexible nature of the pod cover 231 thus accommodates a wide variety of approach angles and elevations. The flexible members of the pod cover 231 can be moved to a first orientation, such as opened, to allow the introduction of the proppant and subsequently moved to a second orientation, such as closed (hanging normally) to close off the interior of the pod when proppant is not being introduced.

Moreover, the transparent nature of the pod cover 231 further enables a monitoring personnel, such one standing on the top of the proppant storage vessel, to readily observe the passage of the various proppant types into the pod. The proppant materials may be color coded or have other distinguishing characteristics, and may be mixed in accordance with some proportion based on geological considerations associated with the fracking operation. Accordingly, the pod cover 231 helps to reduce the generation of particulates during the blending process and at the same time enable the monitoring process to observe the passage of the proppant into the pod.

FIG. 20B further shows a vacuum source 234 adapted to provide negative (vacuum) pressure to the sand catcher 230 and to the interior of the pod 228. It has been found that in some cases, significant dust generation can arise within the pod cover by the high speed introduction of the proppant therein. While the pod cover advantageously reduces such dust from exiting into the surrounding environment, it also tends to retain the dust within the pod chamber which, in turn, may reduce the ability of such monitoring personnel to view the interior of the pod (due to a "dust cloud" within the pod cover). The vacuum source 234 and associated vacuum lines can thus remove such dust from the pod and the sand catcher to alleviate this condition.

The foregoing description of embodiments for the proppant containment system is presented for the purposes of illustration and description. Obvious modifications or variations are possible in light of the above teachings and will readily occur to the skilled artisan in view of the present disclosure. The embodiments are chosen and described in an effort to provide the best illustration of the principles of the disclosure and its practical applications, and to thereby enable one of ordinary skill in the art to utilize the subject matter in various embodiments and with various modifications as are suited to the particular use contemplated.

What is claimed is:

1. An apparatus for a proppant storage chamber, comprising:
   a proppant reduction cover adapted for installation over a first aperture of the proppant storage chamber to reduce emission of airborne proppant during transfer of proppant into the proppant storage chamber from a proppant delivery system comprising a blower that introduces a pressurized flow of the proppant through a conduit at an inlet pressure, the proppant reduction cover having an attachment mechanism adapted to removably attach the proppant reduction cover over the first aperture, the proppant reduction cover comprising a permeable filter material adapted to facilitate a first flow of displaced air therethrough generated responsive to the pressurized flow of the proppant into the proppant storage chamber and to nominally prevent airborne proppant dust from escaping the proppant storage chamber;
   a vent sock adapted for installation over a second aperture of the proppant storage chamber to further reduce said emission of airborne proppant during the transfer of proppant into the proppant storage chamber, the vent sock comprising a permeable filter material adapted to facilitate a second flow of displaced air therethrough generated responsive to the flow of the proppant into the proppant storage chamber and to nominally prevent airborne proppant dust from escaping the proppant storage chamber; and
   a vacuum adapter configured for installation over a third aperture of the proppant storage chamber to further reduce said emission of airborne proppant during the transfer of proppant into the proppant storage chamber, the vacuum adapter attachable to a vacuum line connected to a vacuum source to supply a negative pressure to an interior of the proppant storage chamber during said transfer and maintain an internal pressure within the proppant storage chamber below a predetermined pressure threshold.

2. The apparatus of claim 1, wherein the first aperture comprises a first vent hatch disposed on a top surface of the proppant storage chamber, the second aperture comprises a vent port disposed on a side surface of the proppant storage chamber, and the third aperture comprises a second vent hatch disposed on the top surface of the proppant storage chamber.

3. The apparatus of claim 1, further comprising a pressure regulating valve connected to the vacuum line between the vacuum adapter and the vacuum source to regulate the negative pressure supplied by the vacuum source to the interior of the proppant storage chamber in relation to a magnitude of the inlet pressure to maintain the internal pressure within the proppant storage chamber below the predetermined threshold.

4. The apparatus of claim 1, wherein the proppant reduction cover has a viewing window through which the proppant level in the proppant storage chamber can be viewed, a vent aperture to allow excess pressure escapement, and a closeable flap configured to be removably fastened over the viewing window and the vent aperture.

5. The apparatus of claim 1, wherein the predetermined pressure threshold is nominally ten pounds per square inch (10 psi).

6. The apparatus of claim 5, wherein the inlet pressure of the flow of pressurized proppant is at least nominally 15 psi.

7. The apparatus of claim 1, wherein the proppant storage chamber comprises a moveable conveyor to receive a flow of the proppant through an aperture extending through the proppant storage chamber, and wherein the apparatus further comprises a skirt cover adapted to be attached adjacent the proppant storage chamber to substantially enclose the moveable conveyor retain airborne proppant as the proppant is discharged from the proppant storage chamber onto the moveable conveyor.

8. The apparatus of claim 1, wherein the proppant storage chamber comprises a moveable conveyor to receive a flow of the proppant through an aperture extending through the proppant storage chamber, wherein a blender receptacle is disposed adjacent a distal end of the moveable conveyor to receive the flow of the proppant, and wherein the apparatus further comprises a sand catcher receptacle mounted between the distal end of the moveable conveyor and the blender receptacle to accumulate proppant that fails to reach the blender receptacle from the distal end of the moveable conveyor.

9. The apparatus of claim 8, further comprising a vacuum source which supplies a negative pressure to an interior of the sand catcher using a vacuum line connected between the vacuum source and the sand catcher to remove airborne proppant from the interior of the sand catcher.

10. The apparatus of claim 1, wherein the proppant storage chamber comprises a moveable conveyor to receive a flow of the proppant through an aperture extending through the proppant storage chamber, wherein a blender receptacle is disposed adjacent a distal end of the moveable conveyor to receive the flow of the proppant, and wherein the apparatus further comprises a blender cover which surrounds and encloses the blender receptacle to reduce emission of airborne proppant during transfer of proppant into the blender receptacle, the blender cover comprising at least one surface in facing relation to the distal end of the moveable conveyor comprising a plurality of adjacent flexible transparent members adapted to hang as a curtain and which are moveable from a first orientation in which the members hang in a nominally sealing engagement to enclose the blender receptacle to a second orientation in which the members are displaced to provide an opening to facilitate communication between the distal end of the moveable conveyor and the blender receptacle.

11. The apparatus of claim 10, further comprising a vacuum source which supplies a negative pressure to an interior of the blender receptacle using a vacuum line connected between the vacuum source and the blender receptacle to remove airborne proppant from the interior of the blender receptacle and the blender cover.

12. An apparatus for reducing emission of airborne proppant from a proppant storage chamber during a blow-in process in which proppant is introduced into an interior of the proppant storage chamber from a proppant source using a blower to provide an inlet flow of pressurized proppant at an inlet pressure of at least 15 pounds per square inch (psi), the apparatus comprising:

a textile filter comprising a rectilinear arrangement of filter media configured for attachment to a first vent hatch aperture on a top surface of the proppant storage chamber using an attachment mechanism, the filter media of the textile filter facilitating a first flow of displaced air therethrough generated responsive to a flow of the proppant into the proppant storage chamber and to nominally prevent airborne proppant dust from escaping the proppant storage chamber;

a vent sock comprising an elongated substantially cylindrical arrangement of filter media configured for attachment to a vent aperture on a side surface of the proppant storage chamber using an attachment mechanism, the filter media of the vent sock facilitating a second flow of displaced air therethrough generated responsive to the flow of the proppant into the proppant storage chamber and to nominally prevent airborne proppant dust from escaping the proppant storage chamber; and a vacuum adapter configured for installation over a second vent hatch aperture on the top surface of the proppant storage chamber; and a vacuum source connected to the vacuum adapter via a vacuum line to supply to supply a negative pressure to an interior of the proppant storage chamber during said blow-in process to maintain an interior pressure within the proppant storage chamber at a pressure at or below 10 psi.

13. The apparatus of claim 12, further comprising a pressure regulating valve connected to the vacuum line between the vacuum adapter and the vacuum source to regulate the negative pressure supplied by the vacuum source to the interior of the proppant storage chamber.

14. The apparatus of claim 12, wherein the proppant reduction cover has a viewing window through which the proppant level in the proppant storage chamber can be viewed, a vent aperture to allow excess pressure escapement, and a closeable flap configured to be removably fastened over the viewing window and the vent aperture.

15. The apparatus of claim 12, wherein the inlet flow of pressurized proppant is supplied at an inlet pressure of at least 20 pounds per square inch (psi).

16. The apparatus of claim 12, wherein the vacuum source is configured to maintain the interior pressure at from about 8-10 psi.

17. The apparatus of claim 12, wherein the proppant storage chamber comprises a moveable conveyor to receive a flow of the proppant through an aperture extending through the proppant storage chamber, and wherein the apparatus further comprises a skirt cover adapted to be attached adjacent the proppant storage chamber to substantially enclose the moveable conveyor retain airborne proppant as the proppant is discharged from the proppant storage chamber onto the moveable conveyor.

18. The apparatus of claim 12, wherein the proppant storage chamber comprises a moveable conveyor to receive a flow of the proppant through an aperture extending through the proppant storage chamber, wherein a blender receptacle is disposed adjacent a distal end of the moveable conveyor to receive the flow of the proppant, and wherein the apparatus further comprises a sand catcher receptacle mounted between the distal end of the moveable conveyor and the blender receptacle to accumulate proppant that fails to reach the blender receptacle from the distal end of the moveable conveyor.

19. The apparatus of claim 18, further comprising:
a blender cover which surrounds and encloses the blender receptacle to reduce emission of airborne proppant during transfer of proppant into the blender receptacle, the blender cover comprising at least one surface in facing relation to the distal end of the moveable conveyor comprising a plurality of adjacent flexible transparent members adapted to hang as a curtain and which are moveable from a first orientation in which the members hang in a nominally sealing engagement to enclose the blender receptacle to a second orientation in which the members are displaced to provide an opening to facilitate communication between the distal end of the moveable conveyor and the blender receptacle; and
a vacuum source which supplies a negative pressure to an interior of the blender receptacle using a vacuum line connected between the vacuum source and the blender receptacle to remove airborne proppant from the interior of the blender receptacle and the blender cover.

20. An apparatus for reducing airborne proppant adjacent a fracking material handling system comprising a proppant storage chamber, a moveable conveyor to receive a flow of the proppant from the proppant storage chamber, and a blender receptacle to blend the flow of the proppant from the moveable conveyor, the apparatus comprising:
a proppant reduction cover adapted for installation over a first aperture of the proppant storage chamber to reduce emission of airborne proppant during transfer of proppant into the proppant storage chamber, the proppant reduction cover having an attachment mechanism adapted to removably attach the proppant reduction cover adjacent the vent hatch, the proppant reduction cover comprising a permeable filter material adapted to facilitate a first flow of displaced air therethrough generated responsive to a flow of the proppant into the proppant storage chamber and to nominally prevent airborne proppant dust from escaping the proppant storage chamber, the proppant reduction cover comprising a viewing window through which the proppant level in the proppant storage chamber can be viewed, a vent aperture to allow excess pressure escapement, and a closeable flap configured to be removably fastened over the viewing window and the vent aperture;
a vent sock adapted for installation over a second aperture of the proppant storage chamber to further reduce said emission of airborne proppant during the transfer of proppant into the proppant storage chamber, the vent sock comprising a permeable filter material adapted to facilitate a second flow of displaced air therethrough generated responsive to the flow of the proppant into the proppant storage chamber and to nominally prevent airborne proppant dust from escaping the proppant storage chamber;
a vacuum adapter configured for installation over a third aperture of the proppant storage chamber to further reduce said emission of airborne proppant during the transfer of proppant into the proppant storage chamber, the vacuum adapter attachable to a vacuum line connected to a vacuum source to supply a negative pressure to an interior of the proppant storage chamber during said transfer; and
a skirt cover adapted to be attached adjacent the proppant storage chamber to substantially enclose the moveable conveyor retain airborne proppant as the proppant is discharged from the proppant storage chamber onto the moveable conveyor;
a sand catcher receptacle mounted between a distal end of the moveable conveyor and the blender receptacle to accumulate proppant that fails to reach the blender receptacle from the distal end of the moveable conveyor;
a blender cover which surrounds and encloses the blender receptacle to reduce emission of airborne proppant during transfer of proppant into the blender receptacle, the blender cover comprising at least one surface in facing relation to the distal end of the moveable conveyor comprising a plurality of adjacent flexible transparent members adapted to hang as a curtain and which are moveable from a first orientation in which the members hang in a nominally sealing engagement to enclose the blender receptacle to a second orientation in which the members are displaced to provide an opening to facilitate communication between the distal end of the moveable conveyor and the blender receptacle; and
a vacuum source which supplies a negative pressure to an interior of at least a selected one of the sand catcher or the blender receptacle to remove airborne proppant from the interior of the at least a selected one of the sand catcher or the blender receptacle.

* * * * *